(12) United States Patent
Sumimoto et al.

(10) Patent No.: US 8,221,892 B2
(45) Date of Patent: Jul. 17, 2012

(54) RUBBER-REINFORCED RESIN, ANTI-STATIC RESIN COMPOSITION, MOLDED ARTICLE AND LAMINATE

(75) Inventors: Norifumi Sumimoto, Tokyo (JP); Wataru Kakuno, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 1161 days.

(21) Appl. No.: 12/063,116

(22) PCT Filed: Aug. 23, 2006

(86) PCT No.: PCT/JP2006/316519
§ 371 (c)(1),
(2), (4) Date: Feb. 7, 2008

(87) PCT Pub. No.: WO2007/023865
PCT Pub. Date: Mar. 1, 2007

(65) Prior Publication Data
US 2009/0104466 A1 Apr. 23, 2009

(30) Foreign Application Priority Data

Aug. 25, 2005 (JP) ................. 2005-244932
Sep. 26, 2005 (JP) ................. 2005-278656

(51) Int. Cl.
*B32B 27/30* (2006.01)
*B32B 25/14* (2006.01)
*B32B 33/00* (2006.01)
*C08L 33/06* (2006.01)
*C08L 33/24* (2006.01)

(52) U.S. Cl. ........ 428/521; 428/500; 428/522; 525/218; 525/227

(58) Field of Classification Search .................. None
See application file for complete search history.

(56) References Cited

U.S. PATENT DOCUMENTS 3,919,157 A 11/1975 Ide et al.
(Continued)

FOREIGN PATENT DOCUMENTS

CN 1639253 A 7/2005
(Continued)

OTHER PUBLICATIONS

U.S. Appl. No. 11/916,065, filed Nov. 30, 2007, Sumimoto, et al.
(Continued)

*Primary Examiner* — Monique Jackson
(74) *Attorney, Agent, or Firm* — Oblon, Spivak, McClelland, Maier & Neustadt, L.L.P.

(57) ABSTRACT

The objective of the present invention is to provide a rubber-reinforced resin which, when formed into a molded article, can prevent contamination or soiling of an article contacted with the molded article or a device on the periphery of the molded article and is excellent in impact resistance and transparency, and an anti-static resin composition which is excellent in impact resistance and anti-static properties. The present rubber-reinforced resin comprises a rubber-reinforced copolymeric resin produced by polymerization of 20 to 95 parts by mass of monomer components comprising methyl methacrylate, an aromatic vinyl compound and a cyanidated vinyl compound in the presence of a rubbery polymer having a predetermined volume-average particle diameter, or comprises a mixture of the rubber-reinforced copolymeric resin and a copolymer of the above-mentioned monomer components. Additionally, the present anti-static resin composition comprises the above-mentioned rubber-reinforced resin and a polymer type anti-static agent, wherein the rubbery polymer is contained in an amount from 5% to 40% by mass. In each of the rubber-reinforced resin and the anti-static resin composition, the total amount of substances detected at a retention time of 10 to 24 minutes is 20,000 μg or less per gram of the sample as determined by pyrolysis GC analysis.

3 Claims, 1 Drawing Sheet

U.S. PATENT DOCUMENTS

| | | | | |
|---|---|---|---|---|
| 5,096,995 A | * | 3/1992 | Fukumoto et al. | 528/125 |
| 2004/0110899 A1 | | 6/2004 | Miara et al. | |
| 2005/0049360 A1 | * | 3/2005 | Okamoto | 525/88 |
| 2006/0235154 A1 | | 10/2006 | Miara et al. | |
| 2008/0248227 A1 | * | 10/2008 | Sumimoto | 428/35.7 |

FOREIGN PATENT DOCUMENTS

| | | | |
|---|---|---|---|
| CN | 1659228 | A | 8/2005 |
| DE | 195 32 047 | A1 | 3/1997 |
| JP | 62-241945 | A | 10/1987 |
| JP | 8 41139 | | 2/1996 |
| JP | 8 120032 | | 5/1996 |
| JP | 09-143323 | A | 6/1997 |
| JP | 11 279219 | | 10/1999 |
| JP | 2000 72949 | | 3/2000 |
| JP | 2002-003548 | | 1/2002 |
| JP | 2003 147152 | | 5/2003 |
| JP | 2003 231791 | | 8/2003 |
| JP | 2003 231792 | | 8/2003 |
| JP | 2004 2487 | | 1/2004 |
| JP | 2004 307525 | | 11/2004 |
| JP | 2004 323710 | | 11/2004 |
| JP | 2005 139215 | | 6/2005 |
| JP | 2005-153209 | A | 6/2005 |
| JP | 2005 193507 | | 7/2005 |
| JP | 2006-052378 | A | 2/2006 |
| WO | WO 03/037977 | A2 | 5/2003 |
| WO | WO 03/037977 | A3 | 5/2003 |
| WO | WO 03/074607 | A1 | 9/2003 |

OTHER PUBLICATIONS

U.S. Appl. No. 11/547,191, Sumimoto, et al.

Database WPI Week May 1989, Thomson Scientific, London, GB; AN 1989-037266, XP002551225, Japanese Abstract 63-312342, Dec. 20, 1988, 2 pages.

Sep. 13, 2011 Japanese Office Action with English Language Translation of corresponding Japanese application JP 2006-228158.

Japanese Office Action mailed on Nov. 15, 2011, issued for JP Application No. 2005-244932.

* cited by examiner

RUBBER-REINFORCED RESIN, ANTI-STATIC RESIN COMPOSITION, MOLDED ARTICLE AND LAMINATE

TECHNICAL FIELD

The present invention relates to a rubber-reinforced resin, an anti-static resin composition, a molded article and a laminated article. More specifically, the invention relates to a rubber-reinforced resin having superior impact resistance and transparency, an anti-static resin composition, a molded article and a laminated article, having superior impact resistance and anti-static properties.

PRIOR ART

In recent years, thermoplastic resins have been widely used as molding materials for a holding member, a protective member, a supporting member, a container and the like for an electronic device and the like. A rubber-reinforced resin such as ABS resin, an olefin-based resin and the like are considered to be suitable for use as these thermoplastic resins.

In the above-mentioned applications, when an unreacted monomer, an oligomer, a solvent, a reaction aid and the like remains in the thermoplastic resin or in the composition containing the resin, there are cases where these components adhere to an electronic device or the like as a result of volatilization during holding, transporting or the like of the electronic device or the like, thereby compromising device performance and appearance. In JP-A 2005-139215, a thermoplastic resin composition is disclosed which leads to a molded article causing extremely little outgassing and being excellent in static electricity prevention effects (anti-static properties), and a method is disclosed for obtaining the composition at high purity.

DISCLOSURE OF THE INVENTION

Problems that the Invention is to Solve

An objective of the present invention is to provide a rubber-reinforced resin which, when formed into a molded article, can prevent contamination or soiling of an article contacted with the molded article and of an equipment on the periphery of the molded article and is excellent in impact resistance and transparency, and an anti-static resin composition, a molded article and a laminated article, having superior impact resistance and anti-static properties.

Means for Solving the Problems

The present inventors studied diligently to solve the problems above, and completed the invention by finding out that a specific rubber-reinforced resin is suitable and that a composition comprising this rubber-reinforced resin and a polymer type anti-static agent is preferred. Specifically, the inventors found out that substances detected by pyrolysis-gas chromatography measurements under specified conditions were related to the above-mentioned problems and that a specific rubber-reinforced resin wherein a cyanidated vinyl compound is contained in a small amount and a composition comprising this rubber-reinforced resin can resolve the above-mentioned problems.

The present invention is as follows.

1. A rubber-reinforced resin consisting of a rubber-reinforced copolymeric resin (A1) obtained by polymerization of 20 to 95 parts by mass of a monomer component (b) comprising 60% to 95% by mass of methyl methacrylate (b1), 5% to 40% by mass of an aromatic vinyl compound (b2), and 0% to 10% by mass of a cyanidated vinyl compound (b3) [where (b1)+(b2)+(b3)=100% by mass] in the presence of 5 to 80 parts by mass of a diene-based rubbery polymer (a) having a volume-average particle diameter of 200 to 400 nm [where (a)+(b)=100 parts by mass], or a mixture of the rubber-reinforced copolymeric resin (A1) and a copolymer (A2) of the monomer component (b), the rubber-reinforced resin contains the diene-based rubbery polymer (a) in an amount of 5% to 40% by mass, has haze value of 15% or less, and has the total amount of substances detected at a retention time of 10 to 24 minutes, as determined by pyrolysis-gas chromatography measurement under conditions of a pyrolysis temperature of 423° C. and a pyrolysis time of 30 seconds, of 20,000 µg or less with respect to 1 gram of the rubber-reinforced resin.

2. The rubber-reinforced resin according to 1 above, which is a molding material used for a container for an electronic device or an equipment for the production of an electronic device.

3. An anti-static resin composition comprising 70% to 95% by mass of the rubber-reinforced resin according to 1 above and 5% to 30% by mass of a polymer type anti-static agent (based on 100% by mass of the total of these components), the anti-static resin composition characterized contains the diene-based rubbery polymer (a) in an amount of 5% to 40% by mass, and has the total amount of substances detected at a retention time of 10 to 24 minutes, as determined by pyrolysis-gas chromatography measurement under conditions of a pyrolysis temperature of 423° C. and a pyrolysis time of 30 seconds, of 20,000 µg or less with respect to 1 gram of the composition.

4. The anti-static resin composition according to 3 above, wherein the polymer type anti-static agent is a polyamide-based elastomer.

5. The anti-static resin composition according to 3 above, which is a molding material used for a container for an electronic device or an equipment for the production of an electronic device.

6. A molded article comprising the rubber-reinforced resin according to 1 above.

7. A laminated article, characterized in that a molded article comprising the rubber-reinforced resin according to 1 above is laminated to at least one surface of a support comprising a thermoplastic polymer.

8. A molded article comprising the anti-static resin composition according to 3 above.

9. A laminated article, characterized in that a molded article comprising the anti-static resin composition according to 3 above is laminated to at least one surface of a support comprising a thermoplastic polymer.

Effect of the Invention

The rubber-reinforced resin of the present invention is suitable as a molding material for forming a container for an electronic device (including a holding member or a supporting member); a molding material for forming an equipment for the production of an electronic device such as a wall, a cover (including a protective member) and a transport container and the like, does not generate odor during or after a molded article is produced, leads to an easy production of a molded article having superior impact resistance and transparency, and also prevents contamination or soiling of an article contacted with the molded article and of an equipment on the periphery of the molded article.

According to the molded article of the present invention, Charpy impact strength can be 5 kJ/m² or higher, and haze value can be 15% or less.

The anti-static resin composition of the present invention is suitable as a molding material for forming a container for an electronic device (including a holding member or a supporting member); a molding material for forming an equipment for the production of an electronic device such as a wall, a cover (including a protective member) and a transport container and the like, does not generate odor during or after a molded article is produced, leads to an easy production of a molded article having superior impact resistance and transparency, and also prevents contamination or soiling of an article contacted with the molded article and of an equipment on the periphery of the molded article.

According to the molded article comprising the anti-static resin composition of the present invention, Charpy impact strength can be 8 kJ/m² or higher and surface resistivity can be in the range from $1.0 \times 10^8$ to $1.0 \times 10^{11}$ Ω under conditions of a temperature of 23° C. and a relative humidity of 50%.

Additionally, the laminated article of the present invention can prevent contamination or soiling of an article contacted at a molded article surface and of an equipment on the periphery of the molded article.

[EXPLANATIONS OF NUMERALS]

Figure 1:
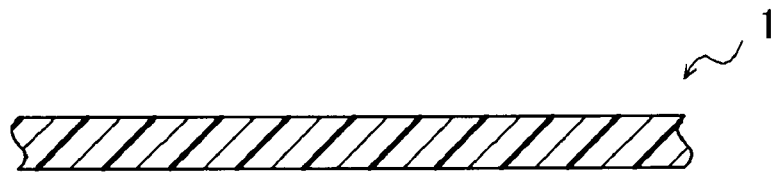
FIG. 1 is a cross-sectional view showing an example of a molded article (thin article) of the present invention.

1; Molded article (Thin article)
2, 2' and 2"; Laminated article
21; Support
22, 22a and 22b; Molded part
23; Thin-walled part.

BEST MODE FOR CARRYING OUT THE INVENTION

In the following, the present invention will be described in greater detail.

It is noted that "(co)polymer(ize)" means homopolymer(ize) and copolymer(ize), and "(meth)acryl" means acryl and methacryl in this specification.

1. Rubber-Reinforced Resin

The rubber-reinforced resin of the present invention is a rubber-reinforced resin consisting of a rubber-reinforced copolymeric resin (A1) obtained by polymerization of 20 to 95 parts by mass of a monomer component (b) comprising 60% to 95% by mass of methyl methacrylate (b1), 5% to 40% by mass of an aromatic vinyl compound (b2), and 0% to 10% by mass of a cyanidated vinyl compound (b3) [where (b1)+(b2)+(b3)=100% by mass] in the presence of 5 to 80 parts by mass of a diene-based rubbery polymer (a) having a volume-average particle diameter of 200 to 400 nm [where (a)+(b)=100 parts by mass], or a mixture of the rubber-reinforced copolymeric resin (A1) and a copolymer (A2) of the monomer component (b), and is characterized in that the rubber-reinforced resin contains the diene-based rubbery polymer (a) in an amount of 5% to 40% by mass, has haze value of 15% or less, and has the total amount of substances detected at a retention time of 10 to 24 minutes (hereinafter, referred to also as "specified detected substance"), as determined by pyrolysis-gas chromatography measurement under conditions of a pyrolysis temperature of 423° C. and a pyrolysis time of 30 seconds, of 20,000 μg or less with respect to 1 gram of the present rubber-reinforced resin.

Each of the above-mentioned rubber-reinforced copolymeric resin (A1) and copolymer (A2) may be used singly or in combination of two or more types thereof. In addition, the mixing ratios have no particular restrictions.

The rubber-reinforced copolymeric resin (A1) and copolymer (A2) contained in the rubber-reinforced resin of the present invention are described below.

1-1. Rubber-Reinforced Copolymeric Resin (A1)

The diene-based rubbery polymer (a) for the formation of the rubber-reinforced copolymeric resin (A1) may be a homopolymer or a copolymer so long as it is a polymer obtained using a diene-based monomer. In addition, these may be used singly or in combination. Further, this diene-based rubbery polymer (a) may be a non-crosslinked polymer or a crosslinked polymer.

Examples of the above-mentioned diene-based rubbery polymer (a) include a homopolymer such as polybutadiene and polyisoprene; a styrene-butadiene-based copolymer such as styrene-butadiene copolymer, styrene-butadiene-styrene copolymer and acrylonitrile-styrene-butadiene copolymer; a styrene-isoprene-based copolymer such as styrene-isoprene copolymer, styrene-isoprene-styrene copolymer and acrylonitrile-styrene-isoprene copolymer; hydrogenated polymers of the above-mentioned (co)polymer and the like.

The above-mentioned copolymer may be a block copolymer or a random copolymer.

The volume-average particle diameter of the above-mentioned diene-based rubbery polymer (a) is preferably in the range from 200 to 400 nm, more preferably from 200 to 350 nm, and further preferably from 250 to 350 nm. If the volume-average particle diameter is smaller than 200 nm, impact resistance tends to be inferior. On the other hand, if the volume-average particle diameter is larger than 400 nm, impact resistance and transparency tend to be inferior. The volume-average particle diameter can be measured by laser diffraction, light scattering, or the like.

The above-mentioned rubbery polymer (a) may be used one enlarged by a known method such as methods described in JP-B H4-79366, JP-A S59-93701, JP-A S56-167704 and the like so long as the volume-average particle diameter is in the above range.

In the present invention, a latex containing the diene-based rubbery polymer (a) is used in order to produce the rubber-reinforced copolymeric resin (A1). Consequently, production is normally carried out by emulsion polymerization in order to produce a diene-based rubbery polymer (a) having the above-mentioned volume-average particle diameter. In this case, the volume-average particle diameter is adjusted by selecting the type and amount of an emulsifier, the type and amount of an initiator, a production condition such as polymerization time, polymerization temperature and stirring condition, and the like. In addition, other methods for adjusting the volume-average particle diameter (particle diameter distribution) include methods involving blending two or more types of diene-based rubbery polymer (a) having different particle diameters.

The monomer component (b) used for the formation of the rubber-reinforced copolymeric resin (A1) contains methyl methacrylate (b1), an aromatic vinyl compound (b2) and a cyanidated vinyl compound (b3). Each of the aromatic vinyl compound (b2) and the cyanidated vinyl compound (b3) may be used singly or in combination of two or more types thereof.

The above-mentioned aromatic vinyl compound (b2) is not particularly limited so long as it is a compound having at least one vinyl bond and at least one aromatic ring. The example includes styrene, α-methyl styrene, o-methyl styrene, p-methyl styrene, vinyl toluene, β-methyl styrene, ethyl styrene, p-tert-butyl styrene, vinyl xylene, vinyl naphthalene, monochlorostyrene, dichlorostyrene, monobromostyrene, dibromostyrene, fluorostyrene and the like. Styrene and α-methyl styrene are preferred among these.

Examples of the above-mentioned cyanidated vinyl compound (b3) include acrylonitrile, methacrylonitrile and the like. Acrylonitrile is preferred among these.

The constituent ratios of the above-mentioned methyl methacrylate (b1), aromatic vinyl compound (b2) and cyanidated vinyl compound (b3) are respectively 60% to 95% by mass, 5% to 40% by mass and 0% to 10% by mass, preferably 60% to 90% by mass, 10% to 40% by mass and 0% to 7% by mass, more preferably 60% to 80% by mass, 20% to 40% by mass and 0% to 5% by mass, further preferably 70% to 80% by mass, 20% to 30% by mass and 0% to 1% by mass, and particularly 70% to 80% by mass, 20% to 30% by mass and 0% by mass, based on 100% by mass of the total thereof. If the ratio of methyl methacrylate (b1) to be used is too low, the transparency tends to be decreased. If the ratio of the aromatic vinyl compound (b2) to be used is too low, the copolymerizability is inferior and the amount of unreacted monomers remained tends to be increased. If it is too high, on the other hand, then the transparency tends to be decreased. Further, if the amount of the cyanidated vinyl compound to be used is too much, the total amount of the detected substance is sometimes too much, and coloration (yellowing) of the molded article may be occurred.

The above-mentioned monomer component (b) may also contain other monomer compound (hereinafter, referred to also as "monomer compound (b4)"). Examples of which are a (meth)acrylate ester compound other than the methyl methacrylate (b1); a maleimide-based compound; an acid anhydride; a vinyl-based compound having a functional group; and the like. These compounds may be used in combination.

Examples of the above-mentioned (meth)acrylic acid alkyl ester compound include ethyl methacrylate, n-propyl methacrylate, isopropyl methacrylate, n-butyl methacrylate, isobutyl methacrylate, tert-butyl methacrylate, n-hexyl methacrylate, methyl acrylate, ethyl acrylate, n-propyl acrylate, isopropyl acrylate, n-butyl acrylate, isobutyl acrylate, tert-butyl acrylate, n-hexyl acrylate and the like. These may be used singly or in combination of two or more types thereof.

Examples of the above-mentioned maleimide-based compound include maleimide, N-methylmaleimide, N-butylmaleimide, N-phenylmaleimide, N-(2-methylphenyl)maleimide, N-(4-hydroxyphenyl)maleimide, N-cyclohexylmaleimide and the like. These may be used alone or in combination of two or more types thereof. Another method for introducing a monomer unit derived from a maleimide-based compound into a polymer includes an imidization after copolymerization with maleic anhydride.

Examples of the above-mentioned acid anhydride include maleic anhydride, itaconic anhydride, citraconic anhydride and the like. These may be used alone or in combination of two or more types thereof.

Additionally, examples of the vinyl-based compound having a functional group include a compound having hydroxyl group such as 2-hydroxyethyl methacrylate, 2-hydroxyethyl acrylate and hydroxystyrene; a compound having amino group such as N,N-dimethylaminomethyl methacrylate, N,N-dimethylaminomethyl acrylate and N,N-diethyl-p-aminomethylstyrene; a compound having epoxy group such as glycidyl methacrylate, glycidyl acrylate, 3,4-oxycyclohexyl methacrylate, 3,4-oxycyclohexyl acrylate, vinylglycidylether, methallyl glycidylether and allyl glycidylether; a compound having amide group such as methacrylamide and acrylamide; a compound having carboxyl group such as methacrylic acid and acrylic acid; a compound having oxazoline group such as vinyl oxazoline; and the like. These may be used alone or in combination of two or more types thereof.

In the case where the above-mentioned monomer component (b) contains the monomer compound (b4), the content of this monomer compound (b4) is preferably in the range from 1% to 10% by mass, more preferably from 1% to 8% by mass, and further preferably from 1% to 5% by mass based on 100% by mass of the total of the monomer component (b).

The above-mentioned rubber-reinforced copolymeric resin (A1) is preferably one produced by emulsion polymerization of the above-mentioned monomer component (b) in the presence of the above-mentioned diene-based rubbery polymer (a).

When the rubber-reinforced copolymeric resin (A1) is produced, the reaction may be conducted by charging all of the monomer component (b) at once in the presence of the whole amount of the diene-based rubbery polymer (a), or by charging the monomer component (b) dividedly or successively. Additionally, these methods may be combined. Further, the reaction may be conducted by adding the whole amount or a part of the diene-based rubbery polymer (a) in the middle of the polymerization.

When the rubber-reinforced copolymeric resin (A1) is manufactured in an amount of 100 parts by mass, the amount of the diene-based rubbery polymer (a) to be used is preferably in the range from 5 to 80 parts by mass, more preferably from 10 to 70 parts by mass, and further preferably from 15 to 60 parts by mass.

In the case of producing the rubber-reinforced copolymeric resin (A1) by emulsion polymerization, a polymerization initiator, a chain-transfer agent (molecular weight adjuster), an emulsifier, water and the like are used.

Examples of the above-mentioned polymerization initiator include a redox-type initiator by combining an organic peroxide such as cumene hydroperoxide, diisopropylbenzene hydroperoxide and p-menthane hydroperoxide, and a reducing agent such as sugar-containing pyrophosphoric acid formulation and sulfoxylate formulation; a persulfate such as potassium persulfate; a peroxide such as benzoyl peroxide (BPO), lauroyl peroxide, tert-butylperoxy laurate and tert-butylperoxy monocarbonate; and the like. These may be used alone or in combination of two or more types thereof. Further, the above-mentioned polymerization initiator is added into the reaction system all at once or continuously. In addition, the above-mentioned polymerization initiator to be used is usually in an amount from 0.1% to 1.5% by mass and preferably from 0.2% to 0.7% by mass with respect to the total amount of the above-mentioned monomer component (b).

Examples of the above-mentioned chain-transfer agent include a mercaptan such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; a terpinolene, α-methyl styrene dimer, and the like. These may be used alone or in combination of two or more types thereof. The above-mentioned chain-transfer agent to be used is usually in an amount from 0.05% to 2.0% by mass with respect to the total amount of the above-mentioned monomer component (b).

Examples of the above-mentioned emulsifier in the case of emulsion polymerization include an anionic surfactant such as a sulfuric acid ester of a higher alcohol, an alkyl benzene sulfonate including sodium dodecylbenzene sulfonate, an aliphatic sulfonate including sodium lauryl sulfonate, a higher aliphatic carboxylate, and a phosphate-based compound; a nonionic surfactant such as alkyl ester or alkyl ether of polyethylene glycol; and the like. These may be used singly or in combination of two or more types thereof. The emulsifier to be used is usually in an amount from 0.3% to 5.0% by mass with respect to the total amount of the above-mentioned monomer component (b).

A latex obtained by emulsion polymerization is usually subjected to solidification by a coagulant, the polymer component is pulverized, and then the product is purified by rinsing and drying. The coagulant may be used an inorganic salt such as calcium chloride, magnesium sulfate, magnesium chloride and sodium chloride; an inorganic acid such as sulfuric acid and hydrochloric acid; an organic acid such as acetic acid and lactic acid; and the like.

In the case of a combination of plural rubber-reinforced copolymeric resins (A1), blending may be conducted after the production of the resins. Other method is one where latexes containing resins respectively are produced, blending is conducted, and then coagulation is conducted to a mixed rubber-reinforced copolymeric resin (A1).

The graft ratio of the above-mentioned rubber-reinforced copolymeric resin (A1) is preferably in the range from 10% to 150%, more preferably from 10% to 100%, and particularly from 10% to 60%. If the graft ratio of the above-mentioned rubber-reinforced copolymeric resin (A1) is less than 10%, appearance and impact resistance of the present composition and a molded article comprising the same may be deteriorated. Additionally, if the graft ratio exceeds 150%, moldability may be inferior.

Here, the graft ratio refers to a value obtained by the following equation:

$$\text{Graft ratio (\% by mass)} = \{(y-x)/x\}100,$$

where x (g) is an amount of the rubber component in 1 gram of the above-mentioned rubber-reinforced copolymeric resin (A1), and y (g) is an amount of an insoluble component when 1 gram of the above-mentioned rubber-reinforced copolymeric resin (A1) is dissolved in acetone.

Moreover, the intrinsic viscosity [η](measured in methylethylketone at a temperature of 30° C.) of a component dissolved by acetone in the above-mentioned rubber-reinforced copolymeric resin (A1) is preferably in the range from 0.1 to 0.6 dl/g, further preferably from 0.1 to 0.4 dl/g, and particularly from 0.1 to 0.35 dl/g. This range leads to excellent moldability. And the rubber-reinforced resin of the present composition and a molded article comprising the same are also excellent in impact resistance.

The above-mentioned graft ratio and intrinsic viscosity [η] can easily be controlled by varying polymerization condition including types or amounts of the polymerization initiator, the chain-transfer agent, the emulsifier, the solvent and the like, polymerization time, polymerization temperature and other conditions in producing the rubber-reinforced copolymeric resin (A1).

The above-mentioned rubber-reinforced copolymeric resin (A1) may be used singly, however, two or more resins may be used in combination, which are obtained by varying the types and amounts of the diene-based rubbery polymer (a), and the types and amounts of the monomer component (b).

As mentioned above, the rubber-reinforced resin of the present invention may be the above-mentioned rubber-reinforced copolymeric resin (A1) or a mixture of this rubber-reinforced copolymeric resin (A1) and a copolymer (A2) which is obtained by polymerization of the above-mentioned monomer component (b).

1-2. Copolymer (A2)

The monomer component (b) for the formation of the copolymer (A2) can be used ones above for the formation of the above-mentioned rubber-reinforced copolymeric resin (A1).

The copolymer (A2) may therefore be a polymer obtained by polymerization of the same monomers as the monomer component (b) used for the formation of the above-mentioned rubber-reinforced copolymeric resin (A1) by the same ratio, a polymer obtained by polymerization of the same monomers by different ratio, or a polymer obtained by polymerization of different monomers from the monomer component (b). The copolymer (A2) may be one in which two or more polymers among these are contained.

The above-mentioned copolymer (A2) is exemplified as below (i) to (v).

(i) Poly Methyl Methacrylate (ii) Polystyrene (iii) Copolymer of Methyl Methacrylate and Aromatic Vinyl Compound In this embodiment (iii), preferable contents of the units are respectively, 50% to 90% by mass and 50% to 10% by mass, more preferably 60% to 90% by mass and 40% to 10% by mass, and further preferably 60% to 80% by mass and 40% to 20% by mass, based on 100% by mass of the total thereof.

Specific examples of this copolymer include methyl methacrylate•styrene copolymer, methyl methacrylate•α-methyl styrene copolymer and the like.

(iv) Copolymer of Methyl Methacrylate, Aromatic Vinyl Compound and Cyanidated Vinyl Compound In this embodiment (iv), preferable contents of the units are respectively, 60% to 95% by mass, 5% to 40% by mass and 0% to 10% by mass, more preferably 60% to 90% by mass, 10% to 40% by mass and 0% to 7% by mass, further preferably 60% to 80% by mass, 20% to 40% by mass and 0% to 5% by mass.

Specific examples of this copolymer include methyl methacrylate•styrene•acrylonitrile copolymer, methyl methacrylate•α-methyl styrene•acrylonitrile copolymer and the like.

(v) Copolymer of Aromatic Vinyl Compound and Cyanidated Vinyl Compound

In this embodiment (v), preferable contents of the units are respectively, 92% to 99% by mass and 8% to 1% by mass. Specific examples include styrene-acrylonitrile and the like.

Among these embodiments (i) to (v), embodiments (iii) and (iv) are preferable. More preferable is the embodiment (iii).

These embodiments (i) to (v) may be used singly or in combination. In addition, ones having different properties such as weight-average molecular weight and intrinsic viscosity may be combined to use.

The intrinsic viscosity [η](measured in methylethylketone at a temperature of 30° C.) of the above-mentioned copolymer (A2) is preferably in the range from 0.1 to 0.8 dl/g, more preferably from 0.1 to 0.6 dl/g, and further from 0.1 to 0.45 dl/g. This range leads to an excellent physical property balance between moldability and impact resistance.

The above-mentioned copolymer (A2) can be produced by polymerization such as solution polymerization, bulk polymerization, emulsion polymerization and suspension polymerization, or the like using a polymerization initiator that is applying in the production of the above-mentioned rubber-reinforced copolymeric resin (A1). Alternatively, the copolymer can be produced by thermal polymerization without a polymerization initiator. These polymerization methods may also be combined. Additives that are blendable in the rubber-reinforced resin of the present invention or in the anti-static resin composition of the present invention and that are to be described may be added to the reaction system, provided that the additives do not inhibit the reaction.

Additionally, the intrinsic viscosity [η] of this copolymer (A2) can be adjusted according to the polymerization conditions.

When the rubber-reinforced resin is a mixture of the above-mentioned rubber-reinforced copolymeric resin (A1) and the above-mentioned copolymer (A2), the resin can be usually manufactured by kneading materials with an extruder, Banbury mixer, a kneader, a roll, a feeder ruder and the like. Using method of the starting materials is not particularly limited and kneading may be initiated after charging all of the starting materials or be conducted while charging them with multi-step or dividedly. The kneading temperature is usually in the range from 180° C. to 260° C., and preferably from 200° C. to 240° C.

1-3. Rubber-Reinforced Resin

The rubber-reinforced resin of the present invention provides the following properties when composed only of the rubber-reinforced copolymeric resin (A1) described above, or when composed of a mixture of this rubber-reinforced copolymeric resin (A1) and the copolymer (A2) obtained by polymerization of the monomer component (b) described above.

[1] The content of the diene-based rubbery polymer (a) in the rubber-reinforced resin of the present invention is in the range from 5% to 40% by mass, preferably from 5% to 35% by mass, more preferably from 5% to 30% by mass, and further preferably from 10% to 30% by mass. If the content of the diene-based rubbery polymer (a) is too low, the impact resistance of the rubber-reinforced resin of the present invention and a molded article comprising the same tend to be insufficient. If this content is too much, the moldability, surface appearance of the molded article, rigidity, impact resistance and the like tend to be insufficient.

[2] The haze value is 15% or less, preferably 12% or less, more preferably 10% or less, and further preferably 5% or less. The haze value is a value found by measurement using a plate-like molded article having a thickness of 2.4 mm that is left for two days under conditions of a temperature of 23° C. and a relative humidity of 50%. The publicly known may be used as a measurement device.

The rubber-reinforced copolymeric resin (A1) will have better transparency with an increase in the degree to which the refractive index of the diene-based rubbery polymer (a) and the refractive index of the copolymer of the monomer component (b) are similar to each other. The refractive index can be adjusted by methods that are well known in the art.

When the rubber-reinforced resin of the present invention is composed of two or more rubber-reinforced copolymeric resins (A1) or of a mixture of the rubber-reinforced copolymeric resin (A1) and the copolymer (A2), the transparency will be improved with a reduction in the difference in refractive index between the rubber-reinforced copolymeric resins (A1) or the difference in refractive index between the rubber-reinforced copolymeric resin (A1) and the copolymer (A2).

An index used for transparency is haze value, and the transparency increases as the haze value decreases.

[3] When pyrolysis-gas chromatography measurements (hereinafter, referred to also as "PyGC measurement") is performed under conditions of a pyrolysis temperature of 423° C. and a pyrolysis time of 30 seconds, the total amount of specified detected substance at a retention time of 10 to 24 minutes is 20,000 μg or less, preferably 19,000 μg or less, more preferably 18,000 μg or less, further preferably 15,000 μg or less and particularly 10,000 μg or less with respect to 1 gram of the rubber-reinforced resin of the present invention. These values are all based on n-octane conversion. If the total amount of the detected substances exceeds 20,000 μg, odor may be generated when the rubber-reinforced resin of the present invention is used to mold, and odor may be generated by the resulting molded article. Therefore, when a container for an electronic device, an equipment for the production of an electronic device, and the like are manufactured, there will be cases in which detrimental effects occur such as contamination of the electronic device, defects, and the like.

The above-mentioned specified detected substance is not clearly defined, but presumably is a nitrogen-containing compound derived from a cyanidated vinyl compound.

The detail conditions of this PyGC measurement are as follows and analyzers to be used is not particularly limited.

| | |
|---|---|
| Pyrolysis temperature | 423° C. (oven temperature; 280° C., needle temperature; 260° C.) |
| Pyrolysis time | 30 seconds |
| Column | "BPX-5" (Fused silica capillary column, film thickness; 0.25 μm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

Further, the rubber-reinforced resin of the present invention preferably has the following properties.

[4] The respective contents of methyl methacrylate unit (b1'), aromatic vinyl compound unit (b2') and cyanidated vinyl compound unit (b3') in the rubber-reinforced resin of the present invention are preferably 60% to 95% by mass, 5% to 40% by mass and 0% to 10% by mass [where (b1')+(b2')+(b3')=100% by mass], more preferably 60% to 90% by mass, 10% to 40% by mass and 0% to 7% by mass, further preferably 60% to 80% by mass, 20% to 40% by mass and 0% to 5% by mass, much more preferably 70% to 80% by mass, 20% to 30% by mass and 0% to 1% by mass, and particularly 70% to 80% by mass, 20% to 30% by mass and 0% by mass. When the content of the cyanidated vinyl compound unit (b3) is too much, the total amount of specified detected substance tends to increase.

The respective contents of the methyl methacrylate unit (b1'), aromatic vinyl compound unit (b2') and cyanidated vinyl compound unit (b3') can be determined with PyGC on a soluble content that is extracted by acetone and contains no diene-based rubbery polymers (a).

The detail conditions of this PyGC measurement are as follows and analyzers to be used is not particularly limited.

| | |
|---|---|
| Pyrolysis temperature | 590° C. (oven temperature; 280° C., needle temperature; 260° C.) |
| Pyrolysis time | 5 seconds |
| Column | "BPX-5" (Fused silica capillary column, film thickness; 0.25 μm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

[5] The intrinsic viscosity [η](measured in methylethylketone at a temperature of 30° C.) of a component dissolved by acetone in the rubber-reinforced resin of the present invention is preferably in the range from 0.1 to 0.6 dl/g, more preferably from 0.1 to 0.4 dl/g and further preferably from 0.1 to 0.35 dl/g. If the limiting viscosity [η] is within this range, physical property balance between moldability and impact resistance is superior.

[6] Charpy impact strength measured according to ISO 179 for the rubber-reinforced resin of the present invention is preferably 5 kJ/m$^2$ or higher, more preferably 7 kJ/m$^2$ or higher, and further preferably 10 kJ/m$^2$ or higher.

[7] The abrasion amount can be preferably reduced to 30 mg or less for a test piece obtained using the rubber-reinforced resin of the present invention, as measured with a reciprocating abrasion wear tester using CS17 as the opposing material under conditions of a load of 1,000 g and a rotation number of 1,000 repetitions of reciprocating movement.

With the molded articles exemplified below, depending on the application or during transport, multiple units may be stacked, lids may be opened and shut for containers with lids, or the molded article may be moved during work along the top surface of a work bench or other apparatus composed of stainless steel plate or the like. When these movements are repeated, abraded powder is generated by the container or the like, and the resulting particles adhere to an article that is contained therein, or external appearance is compromised. The rubber-reinforced resin of the present invention has superior wear resistance, and thus makes it possible to readily obtain a molded article that produces little abraded powder.

The rubber-reinforced resin of the present invention may also contain various additives (such as a filler, an anti-static agent, a thermal stabilizer, an antioxidant, an ultra violet absorber, a flame retardant, an anti-aging agent, a plasticizer, an anti-microbial agent, a sliding agent and a coloring agent) as necessary.

Examples of the filler include heavy calcium carbonate, light calcium carbonate, extrafine activated calcium carbonate, special calcium carbonate, basic magnesium carbonate, kaolin clay, fired clay, pyrophyllite clay, silane-treated clay, synthetic calcium silicate, synthetic magnesium silicate, synthetic aluminum silicate, magnesium carbonate, magnesium hydroxide, kaolin, sericite, talc, pulvenized talc, wollastonite, zeolite, xonotlite, asbestos, PMF (Processed Mineral Fiber), gohun, sepiolite, potassium titanate, ellestadite, gypsum fiber, glass balloon, silica balloon, hydrotalcite, fly ash balloon, shirasu balloon, carbon-based balloon, barium sulfate, aluminum sulfate, calcium sulfate, molybdenum disulfide and the like. These may be used singly or in combination of two or more types thereof.

The content of the above-mentioned filler is usually in the range from 0.05 to 20 parts by mass with respect to 100 parts by mass of the above-mentioned rubber-reinforced resin.

Examples of the anti-static agent include a low molecular weight type anti-static agent, a polymer type anti-static agent and the like. In addition, these may be ion-conductive or electron-conductive.

Examples of the low molecular weight type anti-static agent include an anion-based anti-static agent, a cation-based anti-static agent, a nonion-based anti-static agent, an amphoteric-based anti-static agent, a complexed compound, a metal alkoxide such as an alkoxysilane, an alkoxytitanium and an alkoxyzirconium, and derivatives thereof; coated silica; a phosphate; a phosphoric acid ester; and the like. These may be used singly or in combination of two or more types thereof.

In addition, examples of the polymer type anti-static agent include a vinyl copolymer having a metal ion of a sulfonic acid in its molecule, a metal ion of an alkylsulfonic acid, a metal ion of an alkylbenzenesulfonic acid, betaine and the like. Further, a polyamide elastomer, a polyester elastomer and the like may be also used. These may be used singly or in combination of two or more types thereof.

The content of the above-mentioned anti-static agent is preferably in the range from 5 to 30 parts by mass, more preferably from 10 to 30 parts by mass and further preferably from 15 to 30 parts by mass with respect to 100 parts by mass of the above-mentioned rubber-reinforced resin.

The rubber-reinforced resin of the present invention is suitable as a molding material for forming a container for an electronic device (including a holding member or a supporting member); a molding material for forming an equipment for the production of an electronic device such as a wall, a cover (including a protective member) and a transport container and the like.

2. Anti-Static Resin Composition

The anti-static resin composition of the present invention (hereinafter, referred to simply as "present composition") is a composition that comprises the above-mentioned rubber-reinforced resin (hereinafter, referred to as "component [A]") and a polymer type anti-static agent (hereinafter, referred to as "component [B]"), and has a characterization of which the content of a rubbery polymer is in the range from 5% to 40% by mass in the composition, and the total amount of the substances detected at a retention time of 10 to 24 minutes as determined by pyrolysis-gas chromatography measurement under conditions of a pyrolysis temperature of 423° C. and a pyrolysis time of 30 seconds is 20,000 μg or less with respect to 1 gram of the present composition.

2-1. Component [B]

The component [B] is a polymer type anti-static agent, and the publicly known may be used. Specific examples include a polyamide-based elastomer (including polyether amide, polyether ester amide, polyether amide imide and the like); a polyether ester-based elastomer, a polyester-based elastomer; a polyalkylene oxide-based polymer such as ethylene oxide-epichlorohydrin copolymer; a polyalkylbenzene sulfonic acid salt; an acryl-based copolymer such as polyethylene glycol (meth)acrylate copolymer and methoxy polyethylene glycol (meth)acrylate copolymer; a quaternary ammonium salt group-based copolymer such as a (meth)acrylate copolymer having a quaternary ammonium salt group, a maleimide copolymer having a quaternary ammonium salt group and a methacrylimide copolymer having a quaternary ammonium salt group; a betaine-based copolymer such as a carbobetaine graft copolymer; waxes; ionomer resins, and the like. Further, a block copolymer comprising an olefin polymer block and a polymer block having a hydrophilic group (such as hydroxyl group), such as "PELESTAT 300, 303, 230 SERIES"™ manufactured by Sanyo Chemical Industries, Ltd. may be used. These anti-static agents may be used singly or in combination of two or more types thereof. Further, among these, a polyamide-based elastomer and a polyether ester-based elastomer are preferable.

The polyamide-based elastomer and the polyether ester-based elastomer are described below.

2-1-1. Polyamide-Based Elastomer

Typical examples of the polyamide-based elastomer include a block copolymer comprising a hard segment (x1) derived from a polyamide component and a soft segment (x2) derived from a poly(alkylene oxide) glycol component, and the like.

There are no particular restrictions on the polyamide component used for the formation of the hard segment (x1), provided that the component is a polymer having acid amide bonding (—CO—NH—) in its primary chain. This polyamide component is generally produced by a publicly known method, such as ring-opening polymerization of a lactam compound having a ring structure, polymerization of an amino carboxylic acid, and polycondensation of a dicarboxylic acid and a diamine compound. Consequently, the polyamide component is used in the form of a homopolyamide, copolyamide and the like.

Examples of the lactum compound include ε-caprolactam, ω-laurolactam and the like.

In addition, examples of the amino carboxylic acid include aminocaproic acid, aminoenathic acid, aminocaprylic acid, aminobergonic acid, 7-aminoheptanoic acid, 11-aminoundecanoic acid, 9-aminononanoic acid, 12-aminododecanoic acid and the like.

Examples of the dicarboxylic acid used for the polycondensation of a dicarboxylic acid and a diamine compound include adipic acid, suberic acid, sebacic acid, dodecane dicarboxylic acid, glutaric acid, cyclohexane dicarboxylic acid, terephthalic acid, 2-methyl terephthalate, isophthalic acid, naphthalene dicarboxylic acid and the like. In addition, examples of the diamine compound include ethylene diamine, tetramethylene diamine, hexamethylene diamine, nonamethylene diamine, decamethylene diamine, undecamethylene diamine, dodecamethylene diamine, 2,3,4-trimethyl hexamethylene diamine, 2,4,4-trimethyl hexamethylene diamine, bis(p-aminocyclohexyl)methane, m-xylylene diamine, p-xylylene diamine, paraphenylene diamine, metaphenylene diamine and the like.

Nylon 4, 6, 7, 8, 11, 12, 6.6, 6.9, 6.10, 6.11, 6.12, 6T, 6/6.6, 6/12, 6/6T, 6T/6I and the like may be used as the polyamide component. The terminal end of this polyamide component may be terminated by a carboxylic acid, an amine or the like. Examples of the carboxylic acid include an aliphatic monocarboxylic acid such as caproic acid, caprylic acid, capric acid, lauric acid, myristic acid, palmitic acid, stearic acid and behenic acid. Additionally, examples of the amine include an aliphatic primary amine such as hexyl amine, octyl amine, decyl amine, lauryl amine, myristyl amine, palmityl amine, stearyl amine and behenyl amine, and the like.

The number-average molecular weight of the polyamide component is preferably in the range from 500 to 10,000 and further preferably from 500 to 5,000. In the case where two or more polyamide components are used, the measured value after mixing is to be within the above-mentioned range.

Examples of the poly(alkyleneoxide) glycol component used for the formation of the soft segment (x2) include publicly known polymers such as a polymer represented by the following formula (I), and the polymers may be used singly or in combination of two or more types thereof.

$$HO(CH_2CH_2O)_m(CH_2CH(X)O)_nH \qquad (I)$$

[In the formula, X is hydrogen atom (—H) or substituent —CH$_3$, —CH$_2$Cl, —CH$_2$Br, —CH$_2$I or —CH$_2$OCH$_3$, and n≧0, m≧0, and (n+m)≧20.]

Specific examples of the poly(alkylene oxide) glycol component include polyethylene glycol, poly(1,2-propylene oxide) glycol, poly(1,3-propylene oxide) glycol, poly(tetramethylene oxide) glycol, poly(hexamethylene oxide) glycol, polyethylene oxide, polypropylene oxide, block or random copolymer of ethylene oxide and propylene oxide, block or random copolymer of ethylene oxide and tetrahydrofuran, an alkylene oxide added polymer of bisphenol A, and the like. Among these, polyethylene glycol and an alkylene oxide added polymer of bisphenol A are preferred.

Both terminals of the poly(alkylene oxide) glycol component may be aminated and/or carboxylated.

The number-average molecular weight of the poly(alkylene oxide) glycol component is preferably in the range from 200 to 20,000, more preferably from 300 to 10,000 and further preferably from 300 to 4,000. In the case where two or more poly(alkylene oxide) glycol components are used, the measured value after mixing is to be within the above-mentioned range.

The polyamide-based elastomer can be obtained by polymerization of the polyamide component and the poly(alkylene oxide) glycol component under reduced pressure or at normal pressure.

The ratios of the polyamide component and the poly(alkylene oxide) glycol component to be used are preferably 10% to 95% by mass and 90% to 5% by mass, more preferably 20% to 90% by mass and 80% to 10% by mass, and particularly 30% to 70% mass and 70% to 30% by mass, based on 100% by mass of the total thereof. If the ratio of the polyamide component is less than 10% by mass, the compatibility between the resulting polyamide-based elastomer and a thermoplastic resin may be insufficient, whereas if the ratio exceeds 95% by mass, the effects as an anti-static agent may not be manifested.

When the polymerization is conducted, antimony-based catalyst, tin-based catalyst, titanium-based catalyst, zirconium-based catalyst, acetic acid metal salt-based catalyst and the like may be used.

When the polymerization of the polyamide component and the poly(alkylene oxide) glycol component is conducted, a dicarboxylic acid, a diamine compound and the like may be used as a starting material for polymerization.

Examples of the dicarboxylic acid include an aromatic dicarboxylic acid, an alicyclic dicarboxylic acid and an aliphatic dicarboxylic acid. Examples of the aromatic dicarboxylic acid include terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethane dicarboxylic acid, sodium 3-sulfoisophthalate and the like. Examples of the alicyclic dicarboxylic acid include 1,4-cyclohexane dicarboxylic acid, 1,2-cyclohexane dicarboxylic acid, dicyclohexyl-4,4-dicarboxylic acid and the like. Examples of the aliphatic dicarboxylic acid include succinic acid, oxalic acid, adipic acid, sebacic acid, dodecane dicarboxylic acid and the like. Among these, terephthalic acid, isophthalic acid, 1,4-cyclohexane dicarboxylic acid, sebacic acid, adipic acid and dodecane dicarboxylic acid are preferable. In addition, these dicarboxylic acids may be used singly or in combination of two or more types thereof.

Examples of the diamine compound include an aromatic diamine compound, an alicyclic diamine compound and an aliphatic diamine compound. Examples of the aromatic diamine compound include p-phenylene diamine, m-phenylene diamine, diaminodiphenyl ether, diaminodiphenyl methane and the like. Examples of the alicyclic diamine compound include piperazine, diaminodicyclohexyl methane, cyclohexyl diamine and the like. Examples of the aliphatic diamine compound include hexamethylene diamine, ethylene diamine, propylene diamine, octamethylene diamine and the like. Among these, hexamethylene diamine is preferred. In addition, these diamine compounds may be used singly or in combination of two or more types thereof.

As a result of polymerization of the polyamide component and the poly(alkylene oxide) glycol component, or polymerization of the polyamide component, poly(alkylene oxide) glycol component, dicarboxylic acid, diamine compound and the like, the bonding between the hard segment (x1) and the soft segment (x2) is normally ester bonding or amide bonding, depending on the terminal structure of the soft segment (x2).

The polyamide-based elastomer is preferably a polyether ester amide wherein the amount of a polyether ester unit is in the range from 10% to 95% by mass with respect to the total amount of the polymer, which is obtained using (1) a polyamide obtained by polymerization of an amino carboxylic acid having a carbon number of 6 or more, or a lactam compound, or a polyamide obtained using a diamine compound having a carbon number of 6 or more and a dicarboxylic acid salt, (2) a polyethylene glycol having a number-average molecular weight of 200 to 20,000, and (3) a dicarboxylic acid having a carbon number of 4 to 20.

The reduced viscosity $\eta_{sp/c}$ of the polyamide-based elastomer (measured at 25° C., using 0.5 g/100 mL formic acid solution) is preferably in the range from 0.5 to 3.0 dl/g and further preferably from 1.0 to 2.5 dl/g. There may be a decrease in the molecular weight of the polyamide-based elastomer due to thermal decomposition occurring when the composition of the present invention is produced, during the molding process, or the like. However, the reduced viscosity $\eta_{sp/c}$ of the final product is preferably 0.3 dl/g or greater.

The polyamide-based elastomer can be solely used as the anti-static agent, but a mixture containing a salt including a salt of an alkaline metal such as lithium, sodium and potassium, a salt of an alkaline earth metal such as magnesium and calcium may also be used as the component [B]. It is possible to further improve anti-static properties by incorporating this salt. Blending of the above-mentioned salt may be carried out before, during, or after production of the polyamide-based elastomer, and blending may also be performed during production of the present composition.

Examples of the above-mentioned salt include a halogenide, a salt of an inorganic acid, a salt of an organic acid, and the like.

The halogenide is preferably a halogenide of an alkaline metal and a halogenide of an alkaline earth metal.

In addition, the salt of an inorganic acid is preferably an alkaline metal salt of an inorganic acid.

Examples of the halogenide of an alkaline metal include lithium chloride, sodium chloride, potassium chloride, lithium bromide, sodium bromide, potassium bromide and the like.

Examples of the halogenide of an alkaline earth metal include magnesium chloride, calcium chloride and the like.

Examples of the salt of an inorganic acid include a perchlorate such as lithium perchlorate, sodium perchlorate and potassium perchlorate, and the like.

Examples of the salt of an organic acid include an alkaline metal salt of an carboxylic acid such as potassium acetate and lithium stearate; an alkaline metal salt of an alkylsulfonic acid having an alkyl group having carbon atoms of 8 to 24 such as octyl sulfonic acid, dodecyl sulfonic acid, tetradecyl sulfonic acid, stearyl sulfonic acid, tetracosyl sulfonic acid and 2-ethylhexyl sulfonic acid; an alkaline metal salt of an aromatic sulfonic acid such as phenyl sulfonic acid and naphthyl sulfonic acid; an alkaline metal salt of an alkylbenzenesulfonic acid having an alkyl group having carbon atoms of 6 to 18 such as octylphenyl sulfonic acid, dodecylphenyl sulfonic acid, dibutylphenyl sulfonic acid and dinonylphenyl sulfonic acid; an alkaline metal salt of an alkylnaphthalenesulfonic acid having an alkyl group having carbon atoms of 2 to 18 such as dimethylnaphthyl sulfonic acid, diisopropylnaphthyl sulfonic acid and dibutylnaphthyl sulfonic acid; an alkaline metal salt of a fluorinated sulfonic acid such as trufluoromethane sulfonic acid; an alkaline metal salt of tris(trifluoromethane sulfonyl)methane; and the like.

The above-mentioned salt may be used singly or in combination of two or more types thereof.

The amount of the above-mentioned salt to be formulated is preferably in the range from 0.001 to 10 parts by mass and more preferably from 0.01 to 5 parts by mass based on 100 parts by mass of the above-mentioned polyamide-based elastomer.

2-1-2. Polyether Ester-Based Elastomer

Typical examples of the polyether ester-based elastomer are a block copolymer comprising a hard segment (y1) derived from a polyester component, and a soft segment (y2) derived from a poly(alkylene oxide) glycol component, and the like.

The polyester component used for the formation of the hard segment (y1) may be an aliphatic polyester, an alicyclic polyester or an aromatic polyester. This polyester component is normally produced by reaction of an acid component containing a dicarboxylic acid and/or a dicarboxylic acid ester-forming derivative, and a diol component containing a diol compound and/or diol compound ester-forming derivative. A homopolyester, copolyester or the like may thus be used as the polyester component.

Examples of the dicarboxylic acid in the above-mentioned acid component include an aromatic dicarboxylic acid such as terephthalic acid, isophthalic acid, orthophthalic acid, 2,6-naphthalene dicarboxylic acid, 4,4'-biphenyl dicarboxylic acid, 4,4'-diphenylether dicarboxylic acid, 4,4'-diphenylmethane dicarboxylic acid, 4,4'-diphenylsulfone dicarboxylic acid and 4,4'-diphenylisopropylidene dicarboxylic acid. A substitution compound thereof (including an alkyl group-substituted compound such as methyl isophthalic acid) and a derivative (including an alkyl ester compound such as dimethyl terephthalate, 2,6-naphthalene dicarboxylic acid dimethyl ester) may also be used.

Further, an oxy acid such as p-oxy benzoic acid and p-hydroxy ethoxy benzoic acid, and an ester-forming derivative thereof may also be used.

The above-mentioned acid component may be used alone or in combination of two or more types thereof.

Additionally, examples of the above-mentioned diol component include an aliphatic glycol such as ethylene glycol, propylene glycol, butylenes glycol, hexylene glycol and neophentyl glycol; an alicyclic glycol such as 1,4-cyclohexane dimethanol. A substitution compound thereof and a derivative thereof may also be used. Moreover, a cyclic ester compound such as ε-caprolactam may be used.

Furthermore, a long chain diol compound (such as polyethylene glycol and polytetramethylene glycol), an alkyleneoxide addition polymer of a bisphenol (such as ethylene oxide adduct to bisphenol A) and the like may be used as necessary.

The above-mentioned diol component may be used singly or in combination of two or more types thereof.

Examples of the above-mentioned polyester component include poly ethylene terephthalate, poly propylene terephthalate, poly butylene terephthalate, poly hexamethylene terephthalate, poly cyclohexane-1,4-dimethylterephthalate, poly neopentyl terephthalate, poly ethylene isophthalate, poly ethylene naphthalate, poly butylenes naphthalate, poly hexamethylene naphthalate and the like. Additionally, a copolymerized polyester may be used.

The average molecular weight of the above-mentioned polyester component is not particularly limited, however, the reduced viscosity $\eta_{sp/c}$ is preferably in the range from 0.3 to 2.5 dl/g and further preferably from 0.5 to 2.5 dl/g, which is an index for the average molecular weight.

The above-mentioned soft segment (x2) may be used without modification as the poly(alkylene oxide) glycol component used for the formation of the soft segment (y2).

The polyether ester-based elastomer can be solely used as the anti-static agent, but a mixture containing an organosulfonic acid-based compound, a phenolic compound, a component that is a jointly usable salt in the above description for the polyamide-based elastomer, and the like can lead to superior anti-static properties.

The organosulfonic acid-based compound may be a compound formed from an organosulfonic acid and a base, or the like. The compounds are included among the low molecular weight type anti-static agents described below, and are not particularly restricted.

The above-mentioned organosulfonic acid is preferably an alkyl sulfonate having an alkyl group whose number of carbon atoms is 8 to 24, an alkylbenzene sulfonate having an alkyl group whose number of carbon atoms is 6 to 18, and an alkylnaphthalene sulfonate having an alkyl group whose number of carbon atoms is 2 to 18. Specific examples include a tetradecyl sulfonate, a dodecylphenyl sulfonate and dimethylnaphthyl sulfonate. Sodium tetradecyl sulfonate, sodium dodecylphenyl sulfonate, sodium dimethylnaphthyl sulfonate, tetrabutylphosphonium dodecylphenyl sulfonate and the like may be used.

The above-mentioned organosulfonic acid-based compounds may be used singly or in combination of two or more types thereof.

There are no particular restrictions on the phenolic compound. The compound may be one comprising only one phenol backbone (—$C_6H_5OH$) or one comprising two or more phenol backbones.

Examples of the above-mentioned phenolic compound include 3,9-bis[2-(3-(3-tert-butyl-4-hydroxy-5-methylphenyl)-propionyloxy)-1,1-di methylethyl]-2,4,8,10-tetraoxaspiro(5,5)undecane (molecular weight 741), 1,3,5-trimethyl-2,4,6-tris(3,5-di-tert-butyl-4-hydroxybenzyl)benzene (molecular weight 775), tris-(3,5-di-tert-butyl-4-hydroxybenzyl)-isocyanurate (molecular weight 784) and the like. Among these, compounds having molecular weight in the range from 700 to 1,200 are preferable.

There are also compounds that are used as an antioxidant among the above-mentioned compounds, and these antioxidants may be used without further modification.

The phenolic compounds may be used singly or in combination of two or more types thereof.

When the above-mentioned polyether ester-based elastomer is combined with an organosulfonic acid-based compound and a phenolic compound, superior anti-static properties can be imparted. Preferred configurations are described below. Specifically, the amount of the organosulfonic acid-based compound is in the range from 4% to 30% by mass and preferably from 10% to 30% by mass, and the amount of the phenolic compound is in the range from 0.1% to 3.5% by mass and preferably 0.2% to 2% by mass based on 100% by mass of the total amount of the three components, and the balance is polyether ester-based elastomer.

Additionally, when the above-mentioned salt is used, the method of use is the same as one for the polyamide-based elastomer.

In the case where the above-mentioned polyamide-based elastomer and polyether ester-based elastomer are used in combination, the amount of the salt to be formulated is preferably in the range from 0.001 to 10 parts by mass and more preferably from 0.01 to 5 parts by mass with respect to 100 parts by mass of the polyamide-based elastomer and the polyether ester-based elastomer.

2-2. Anti-Static Resin Composition

In the present composition, content ratios of the above-mentioned components [A] and [B] are 70% to 95% by mass and 30% to 5% by mass, preferably 75% to 95% by mass and 25% to 5% by mass, more preferably 75% to 90% by mass and 25% to 10% by mass, and further preferably 75% to 85% by mass and 25% to 15% by mass, respectively, taking the total amount thereof as 100% by mass. If the content of this component [A] is too little (content of the component [B] is too much), rigidity sometimes decreases, and the material may be inappropriate for use in films, sheets, containers and the like. On the other hand, if the content of the component [A] is too much (content of the component [B] is too little), the anti-static properties will be insufficient.

The thermoplastic resin composition may contain further additives such as a low molecular weight type anti-static agent, an ultra violet absorber, a weather resisting agent, a filler, an antioxidant, an anti-aging agent, a flame retardant, an anti-fogging agent, a sliding agent, an anti-microbial agent, a tackifier, a plasticizer and a coloring agent; other polymers depending on purpose or application.

The low molecular weight type anti-static agent may be used materials exemplified in section 1-3 above. These may be used singly or in combination of two or more types thereof.

The content of the above-mentioned low molecular weight type anti-static agent is usually in the range from 0.1 to 1 part by mass with respect to 100 parts by mass of the above-mentioned component [A].

Examples of the ultra violet absorber include benzophenones, benzotriazoles, a salicylic acid ester, a metal complex salt and the like. These may be used singly or in combination of two or more types thereof.

The content of the above-mentioned ultra violet absorber is usually in the range from 0.05 to 5 parts by mass with respect to 100 parts by mass of the above-mentioned component [A].

Examples of the weather resisting agent include an organic phosphorus-based compound, an organic sulfur-based compound, an organic compound having hydroxyl group, and the like. These may be used singly or in combination of two or more types thereof.

The content of the above-mentioned weather resisting agent is usually in the range from 0.1 to 5 parts by mass with respect to 100 parts by mass of the above-mentioned component [A].

The filler may be used materials exemplified in section 1-3 above. These may be used singly or in combination of two or more types thereof.

The content of the above-mentioned filler is usually in the range from 0.05 to 20 parts by mass with respect to 100 parts by mass of the above-mentioned component [A].

Examples of the antioxidant include hindered amines; hydroquinones; hindered phenols; a sulfur-containing compound and the like. These may be used alone or in combination of two or more types thereof.

The content of the above-mentioned antioxidant is usually in the range from 0.1 to 0.5 part by mass with respect to 100 parts by mass of the above-mentioned component [A].

Examples of the anti-aging agent include a naphtylamine-based compound, a diphenylamine-based compound, p-phenylenediamine-based compound, a quinoline-based compound, a hydroquinone derivative, a monophenol-based compound, a bisphenol-based compound, a trisphenol-based compound, a polyphenol-based compound, a thiobisphenol-based compound, a hindered phenol-based compound, a phosphate ester-based compound and the like. These may be used alone or in combination of two or more types thereof.

The content of the above-mentioned anti-aging agent is usually in the range from 0.1 to 0.5 part by mass with respect to 100 parts by mass of the above-mentioned component [A].

Examples of the other polymer include a polycarbonate, polypropylene, polyethylene and the like.

The composition of the present invention has the following characteristics.

[1] The content of the rubbery polymer (a) in the present composition is in the range from 5% to 40% by mass, preferably from 5% to 35% by mass, more preferably from 5% to 30% by mass, and further preferably from 10% to 30% by mass. If the content of the rubbery polymer (a) is too low, the impact resistance of the present composition and the molded article comprising the same tends to be insufficient. If this content is too much, on the other hand, the moldability, surface appearance of the resultant molded article, rigidity, heat resistance and other properties tend to be insufficient.

[2] When pyrolysis-gas chromatography measurements (hereinafter, referred to as "PyGC measurement") is performed under conditions of a pyrolysis temperature of 423° C. and a pyrolysis time of 30 seconds, the total amount of substances (hereinafter, referred to also as "specified detected substance") detected at a retention time of 10 to 24 minutes is 20,000 µg or less, preferably 19,000 µg or less, more preferably 18,000 µg or less, further preferably 15,000 µg or less and particularly 10,000 µg or less with respect to 1 gram of the present composition. These values are all based on n-octane conversion. If the total amount of the specified detected substance exceeds 20,000 µg, odor may be generated when the rubber-reinforced resin of the present invention is used to mold, and odor may be generated by the resulting molded article. Therefore, when a container for an electronic device, an equipment for the production of an electronic device, and the like are manufactured, there will be cases in which detrimental effects occur such as contamination of the electronic device, defects, and the like.

The above-mentioned specified detected substance is not clearly defined, but presumably is a nitrogen-containing compound derived from a cyanidated vinyl compound (b2) used in the formation of the component [A].

The detail conditions of this PyGC measurement are as follows and analyzers to be used is not particularly limited.

| | |
|---|---|
| Pyrolysis temperature | 423° C. (oven temperature; 280° C., needle temperature; 260° C.) |
| Pyrolysis time | 30 seconds |
| Column | "BPX-5" (Fused silica capillary column, film thickness; 0.25 µm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

Further, the present composition preferably has the following properties.

[3] Taking units derived from the monomer (b1), cyanidated vinyl compound (b2) and monomer (b3) used for the formation of the component [A] as unit (b1'), unit (b2') and unit (b3'), the respective contents are preferably 60% to 100% by mass, 0% to 10% by mass, and 0% to 30% by mass [where (b1')+(b2')+(b3')=100% by mass], more preferably 65% to 100% by mass, 0% to 10% by mass, and 0% to 25% by mass, further preferably 75% to 100% by mass, 0% to 5% by mass, and 5% to 20% by mass, and particularly 100% by mass, 0% by mass, and 0% by mass. If the content of unit (b2') is too much, the total amount of the specified detected substance tends to be increased.

The contents of methyl methacrylate unit and aromatic vinyl compound unit in the unit (b1') are respectively preferably 10% to 90% by mass and 90% to 10% by mass, more preferably 10% to 80% by mass and 90% to 20% by mass, and further preferably 20% to 80% by mass and 80% to 20% by mass based on 100% by mass of the total amount of these.

The contents of units (b1'), (b2') and (b3') can be determined by PyGC on a polymer component extracted from the present composition using acetone, i.e., a component (hereinafter, referred to as "component dissolved by acetone") containing no polymer components such as rubbery polymer (a), component [B] and other polymers.

The detail conditions of this PyGC measurement are as follows and analyzers to be used is not particularly limited.

| | |
|---|---|
| Pyrolysis temperature | 590° C. (oven temperature; 280° C., needle temperature; 260° C.) |
| Pyrolysis time | 5 seconds |
| Column | "BPX-5" (Fused silica capillary column, film thickness; 0.25 µm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

[4] The intrinsic viscosity [η](measured in methylethylketone at a temperature of 30° C.) of a component dissolved by acetone in the present composition is preferably in the range from 0.1 to 0.6 dl/g, more preferably from 0.1 to 0.4 dl/g, and further preferably from 0.1 to 0.35 dl/g. When the intrinsic viscosity [r] is within the above-mentioned range, excellent physical property balance between moldability and impact resistance may be obtained.

[5] Charpy impact strength measured according to ISO 179 for the present composition is preferably 8 kJ/m$^2$ or higher, more preferably 10 kJ/m$^2$ or higher, and further preferably 12 kJ/m$^2$ or higher.

[6] The surface resistivity of the present composition under conditions of a temperature of 23° C. and a relative humidity of 50% is preferably $10^{11}\Omega$ or less, more preferably $10^{10}\Omega$ or less and further preferably $10^9\Omega$ or less.

The present composition is suitable as a molding material for forming a container for an electronic device (including a holding member or a supporting member); a molding material for forming an equipment for the production of an electronic device such as a wall, a cover (including a protective member) and a transport container and the like.

3. Molded Article

The above-mentioned rubber-reinforced resin of the present invention and the above-mentioned composition of the present invention can be subjected to conventional molding method including injection molding, extrusion molding (sheet extrusion, T-die extrusion, profile extrusion), calender molding, blown film extrusion, hollow molding, compression molding, vacuum molding, foam molding, blow molding and the like to form into a molded article in a prescribed shape. Respective mold processing methods may be combined with each other and drawing processing may also be carried out.

The molded article of the present invention can be one having a shape in accordance with objectives, applications and the like. Examples include a container such as a tray and a case; a thin article such as a sheet, a film and a plate (refer to FIG. 1); a rod-shaped article such as a cylindrical rod and a square rod; modified forms thereof; irregularly shaped articles and the like. Any section of these molded articles may have a thin-walled part, depression, groove, hole and the like, in accordance with objectives or applications. Through holes may also be provided.

In addition, the molded article of the present invention is suitable for a container and a tray for an electronic device (including a holding member or a supporting member); an equipment for the production of an electronic device such as a wall, a curtain, a cover (including a protective member) and a transport container; and the like. Since the molded article made from the above-mentioned rubber-reinforced resin is excellent in transparency as well as capability of preventing contamination or soiling of an article contacted and of an equipment on the periphery of the molded article, it is an increasing in visibility of a contained or packaged goods.

The molded article of the present invention is suitable as a composite article wherein it is integrated with a molded article composed of other materials, e.g., a laminated article or the like described below. Consequently, in the case where a molded part produced using the above-mentioned rubber-reinforced resin of the present invention is at the surface in the composite article, contamination or soiling of an article contacted with the article and of an equipment on the periphery of the article is inhibited. When the above-mentioned other materials are transparent, the transparency of the composite article as a whole is superior. Furthermore, in the case where a molded part produced using the above-mentioned composition of the present invention is at the surface in the composite article, contamination or soiling of an article contacted with the article and of an equipment on the periphery of the article is also inhibited.

4. Laminated Article

The laminated article of the present invention is characterized in that a molded article comprising the above-mentioned rubber-reinforced resin or the composition of the present invention is laminated to at least one surface of a support comprising a thermoplastic polymer. That is to say, the laminated article of the present invention has a support containing a thermoplastic polymer and a molded article that is disposed on at least one surface of this support and contains the above-mentioned rubber-reinforced resin or the composition of the present invention (hereinafter, referred to as "molded part"). The number of molded parts on the support may be one, two or more.

The support may be made of only a thermoplastic polymer, or of a composition comprising a thermoplastic polymer and other component (e.g., the additives described above).

Examples of this thermoplastic polymer include a polyolefin-based resin, a rubber-reinforced resin, a polyester-based resin, an acryl-based resin, a polyamide-based resin, a polycarbonate resin, various thermoplastic elastomers, a liquid crystal polymer, a polyurethane-based resin, a polyacetal resin, a polyphenylene ether resin, a fluorine-based resin, a styrene-based resin, a polyvinyl chloride-based resin, polyvinylidene chloride, poly vinyl acetate resin and the like. These may be used singly or in combination of two or more types thereof. It is noted that these resins may be recycled.

Among these polymers, a rubber-reinforced resin, a polyamide-based resin and a styrene-based resin are preferable.

In the case of the rubber-reinforced resin, it may be the above-mentioned component [A] or a rubber-reinforced resin other than the component [A].

In the case of the polyamide-based resin, there are no limitations so long as it has an acid amide bonding (—CO—NH—) in its principal chain. Example thereof include Nylon 4, 6, 7, 8, 11, 12, 6.6, 6.9, 6.10, 6.11, 6.12, 6T, 6/6.6, 6/12, 6/6T, 6T/6I and the like. The terminal end of the polyamide-based resin may be terminated by a carboxylic acid (including an aliphatic monocarboxylic acid and the like), an amine (including an aliphatic primary amine and the like), and the like.

The polyamide-based resin may be used singly or in combination of two or more types thereof.

Additionally, examples of the styrene-based resin include polystyrene, a styrene•(meth)acrylic acid ester copolymer, a styrene•cyanidated vinyl compound copolymer, styrene•(meth)acrylic acid ester•cyanidated vinyl compound copolymer and the like. These polymers may be used singly or in combination of two or more types thereof.

The shape of the above-mentioned support may be plate-like, linear, clumpy or the like. The entire body or a part thereof may be curved or may have depressions, protrusions, holes, though-holes or the like. For example, the shape may be that of a container such as a tray and a case.

The preferred shape is tabular such as a sheet and a film, and the average thickness in such a case is preferably in the range from 0.05 to 3 mm, more preferably from 0.05 to 2 mm and further preferably from 0.05 to 1 mm.

On the other hand, the molded part is disposed on at least one surface of the above-mentioned support. The shape thereof may be the same as the shape of the support, or may be a completely different shape. In addition, a depression, protrusion, hole, through hole or the like may be present.

The preferred shape is tabular such as a sheet and a film, and the average thickness in such a case is preferably in the range from 0.05 to 3 mm, more preferably from 0.05 to 2 mm and further preferably from 0.05 to 1 mm.

Figure 2:
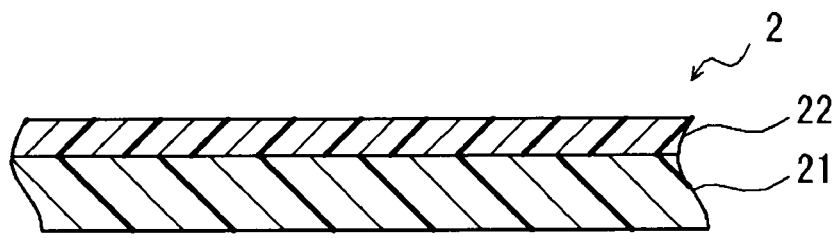
FIG. 2 is a cross-sectional view showing an example of a laminated article of the present invention.
Figure 3:
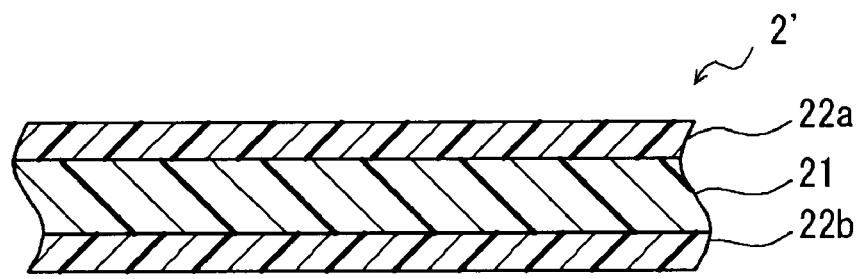
FIG. 3 is a cross-sectional view showing another example of an laminated article of the present invention.

Accordingly, when the laminated article of the present invention is, for example, tabular, it may have an embodiment 2 having a support 21 and a molded part 22 disposed on one surface of the support 21 (refer to FIG. 2), or an embodiment 2' having a support 21 and molded parts 22a and 22b disposed on both surfaces of the support 21 (refer to FIG. 3).

The molded part is one comprising the above-mentioned rubber-reinforced resin or the composition of the present invention, but may also be one containing other substances. When the laminated article is formed that has a plurality of molded parts as in the embodiment shown in FIG. 3, the constituent material of each of the molded parts may be the same or different. In addition, the thicknesses of the molded parts may be the same or different.

In the case where the above-mentioned molded part is composed of the composition of the present invention and the respective molded parts have the same constituent material, a laminated article can be one having superior anti-static properties on both surfaces. Further, when the constituent materials of the respective molded parts are different, a laminated article can be one in which the anti-static properties on the one surface comprising the above-mentioned composition of the present invention are superior, whereas the anti-static properties on the other surface are different in degree.

Figure 4:
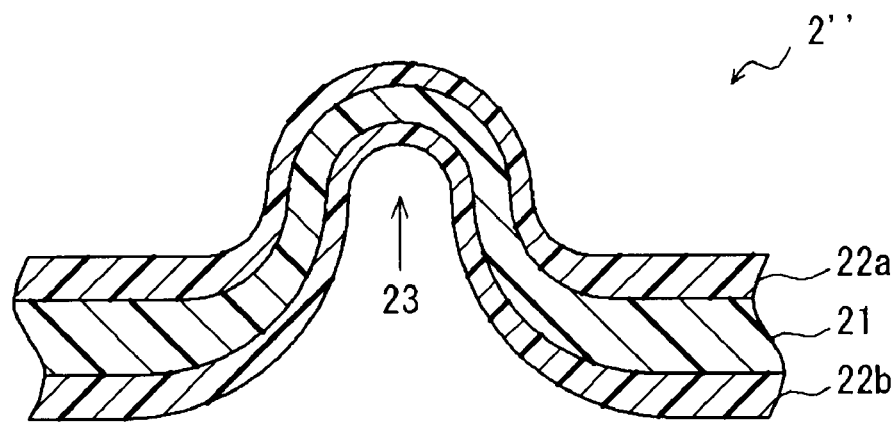
FIG. 4 is a partial sectional view showing an laminated article having a protruding thin-walled part.

As is described above, the laminated article of the present invention may have an embodiment in which a thin-walled part 23 is provided locally by drawing or the like (refer to FIG. 4). FIG. 4 is a partial sectional view of an embodiment 2" in which the thicknesses of the molded parts 22a and 22b and the support 21 in the thin-walled part 23 are small relative to the other sections of the thin-walled part.

There are no particular restrictions on the method for manufacturing the laminated article of the present invention. There are (i) a method in which a support and a molded article that will constitute a molded part are prepared separately and integrated; (ii) a method in which a support-forming material (containing a thermoplastic polymer) and a molded part-forming material (containing the above-mentioned rubber-reinforced resin or the composition of the present invention) are used to produce a composite article in a single step; and the like.

Examples of the embodiment (i) above include a method in which the support and the molded article that will constitute the molded part are prepared separately and hot-pressed or subjecting to joining with an adhesive or pressure-sensitive adhesive, and the like. The above-mentioned support and molded article may be produced in their respective prescribed shapes, and, as necessary, the surfaces to be joined can be modified by a corona discharge treatment, flame treatment, oxidation treatment, plasma treatment, UV treatment, ion bombardment treatment, solvent treatment, anchor coat treatment, or the like. When the above-mentioned support and molded article are thin articles, a flat film or a flat sheet may be produced in advance by injection molding, calender molding, blown film extrusion, sheet extrusion, T-die extrusion or the like, whereupon a laminated film or laminated sheet may be produced by the methods described above.

In the above-mentioned embodiment (ii), a laminated article can be obtained by co-extrusion, multilayered blown film extrusion or the like with the support-forming material and the molded part-forming material.

In addition, in order to produce a laminated article 2" having a thin-walled part 23 as shown in FIG. 4, the laminated article 2' shown in FIG. 3 is produced, and the thin-walled part 23 having a prescribed drawing multiplication factor can then be formed by a method such as calender molding, inflation molding and vacuum molding.

The laminated article of the present invention is suitable as a container and a tray for an electronic device (including a holding member or a supporting member); an equipment for the production of an electronic device such as a wall, a curtain, a cover (including a protective member) and a transport container; and the like. In the above-mentioned applications, when electronic components, electronic devices, and other materials in contact with the laminate article are to be loaded, protected or the like, it is preferable for the molded article (molded part) comprising the rubber-reinforced resin of the present invention or the composition of the present invention to be on the surface.

EXAMPLES

Hereinafter, the present invention will be described in greater detail by referring to Examples. The present invention is in no way limited by these Examples. In addition, "part" and "%" in the following are based on mass unless otherwise indicated.

1. Method for Evaluation

The measurement methods for each of the evaluation items in the following Examples and Comparative Examples are described below.

(1) Total Amount of Substances Detected by PyGC Measurement

A pyrolysis-gas chromatograph apparatus in which a high-frequency induction heating pyrolysis device (Type "JPS-350" manufactured by JAPAN Analytical Industry Co., Ltd.) was set to the gas chromatograph apparatus (Type "GC-14A" manufactured by Shimadzu Corp.) was used. About 0.25 gram of a sample (prepared from a pellet) was enclosed in a pyrofoil and was subjected to measurements under the conditions indicated below. From the resulting chromatograph, substances detected at a retention time of 10 to 24 minutes were identified, and the total amount based on n-octane conversion (total amount of detected substances) was determined.

<Measurement Conditions>

| | |
|---|---|
| Pyrolysis temperature | 423° C. (oven temperature; 280° C., needle temperature; 260° C.) |
| Pyrolysis time | 30 seconds |
| Column | "BPX-5" (Fused silica capillary column, film thickness; 0.25 μm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

(2) Charpy Impact Strength

It was measured according to ISO 179.

(3) Haze Value

A plate-like test piece (thickness 2.4 mm) prepared using the rubber-reinforced resin or the anti-static resin composition was left at a temperature of 23° C. and a relative humidity of 50% for two days, and the haze value was measured under the same conditions. A hazemeter (Trade name "haze-gard plus") manufactured by Gardner was used as the measurement device.

(4) Odor

Pellet-form rubber-reinforced resin or anti-static resin composition was introduced into a sample vial. After leaving for 1 hour at a temperature of 80° C., odor evaluation was carried out and evaluated according to the following criteria.

◯: No odor

X: Odor (5) Appearance of Molded Article

A plate-like test piece prepared using a rubber-reinforced resin (height 300 mm, width 300 mm, thickness 0.65 mm), as well as a film and a laminated article were observed visually on both surfaces in regard to smoothness, and the surface appearance was evaluated according to the following criteria.

◯: Excellent smoothness; favorable

X: Poor smoothness; unfavorable (6) Amount of Constituent Units in the Component Dissolved by Acetone in Rubber-Reinforced Resin and Anti-Static Resin Composition The same analytical apparatus as in (1) above was used, and the respective amounts of methyl methacrylate unit, aromatic vinyl compound unit (styrene unit) and cyanidated vinyl compound unit (acrylonitrile unit) were quantified under the following conditions.

<Measurement Conditions>

| | |
|---|---|
| Pyrolysis temperature | 590° C. (oven temperature; 280° C., needle temperature; 260° C.) |
| Pyrolysis time | 5 seconds |
| Column | "BPX-5" (Fused silica capillary column, film thickness; 0.25 μm, inner diameter; 0.25 mm, length; 30 m) manufactured by GL Sciences Inc. |
| Column temperature | 50° C. –> 350° C. (temperature ramp rate; 10° C./min.), hold at 350° C. for 5 minutes |
| GC injection port temperature | 350° C. |
| Detector | FID |
| Detector temperature | 350° C. |
| Carrier gas | Helium (Flow rate; 1 ml/min., split ratio; 1/50) |

(7) Anti-Static Properties

A test piece prepared using the anti-static resin composition was left at a temperature of 23° C. and a relative humidity of 50% for 48 hours. After that, the surface resistivity (Ω) was measured at an applied voltage of 500 V using a resistivity meter (Trade name "Hiresta UP MCP-HT450", manufactured by Dia Instruments Co., Ltd.).

2. Rubber-Reinforced Resin and Evaluation Thereof 2-1. Starting Materials for Rubber-Reinforced Resin Production Example 1

Production of Rubber-Reinforced Copolymeric Resin [A1-1]

100 parts of ion exchanged water, 2 parts of potassium rosinate, 0.5 part of tert-dodecylmercaptan, 30 parts (solids conversion) of a butadiene rubber latex having a volume-average particle diameter of 300 nm, 4 parts of styrene, 1 part of acrylonitrile and 12 parts of methyl methacrylate were introduced into a glass flask having an inner volume of 7 liters and equipped with an agitator and temperature was raised while stirring. Upon reaching a temperature of 50° C., an aqueous activator containing 0.2 part of sodium ethylenediamine tetraacetate, 0.05 part of ferrous sulfate, 0.2 part of sodium formaldehyde sulfoxylate dihydrate, and 10 parts of ion exchanged water was added along with 0.2 part of cumene hydroperoxide, and reacted for one hour. Subsequently, the reaction was continued while continuously adding 12 parts of styrene, 4 parts of acrylonitrile, 37 parts of methyl methacrylate and 0.2 part of cumene hydroperoxide over a period of four hours. The polymerization conversion of the monomers after the reaction was 96%. The resultant latex was then heated to 90° C. and was subjected to coagulation using 36% calcium chloride aqueous solution. The resulting slurry was heated to 95° C. and held for 5 minutes. After that, the slurry was washed with water and dehydrated. The material was dried at 75° C. for 24 hours to obtain powdered rubber-reinforced copolymeric resin [A1-1]. A component dissolved by acetone in this rubber-reinforced copolymeric resin [A1-1] was styrene/acrylonitrile/methyl methacrylate=24.3%/7.7%/68.0%.

Production Example 2

Production of Rubber-Reinforced Copolymeric Resin [A1-2]

100 parts of ion exchanged water, 1 part of potassium rosinate, 0.5 part of tert-dodecylmercaptan, 18 parts (solids conversion) of butadiene rubber latex having a volume-average particle diameter of 310 nm, 5 parts of styrene and 15 parts of methyl methacrylate were introduced into a were introduced into a glass flask having an inner volume of 7 liters and equipped with an agitator and temperature was raised while stirring. Upon reaching a temperature of 50° C., an aqueous activator containing 0.2 part of sodium ethylenediamine tetraacetate, 0.01 part of ferrous sulfate, 0.2 part of sodium formaldehyde sulfoxylate dihydrate, and 10 parts of ion exchanged water was added along with 0.2 part of cumene hydroperoxide, and reacted for one hour. Subsequently, the reaction was continued while continuously adding 15 parts of styrene, 47 parts of methyl methacrylate and 0.2 part of cumene hydroperoxide over a period of four hours. The polymerization conversion of the monomers after the reaction was 96%. The resultant latex was then heated to 90° C. and was subjected to coagulation using 36% calcium chloride aqueous solution. The resulting slurry was heated to 95° C. and held for 5 minutes. After that, the slurry was washed with water and dehydrated. The material was dried at 75° C. for 24 hours to obtain powdered rubber-reinforced copolymeric resin [A1-2]. A component dissolved by acetone in this rubber-reinforced copolymeric resin [A1-2] was styrene/methyl methacrylate=26.9%/73.1%.

Production Example 3

Production of Rubber-Reinforced Copolymeric Resin [A1-3]

100 parts of ion exchanged water, 2 parts of potassium rosinate, 0.5 part of tert-dodecylmercaptan, 18 parts (solids conversion) of butadiene rubber latex having a volume-average particle diameter of 280 nm, 4 parts of styrene, 2 parts of acrylonitrile and 15 parts of methyl methacrylate were introduced into a glass flask having an inner volume of 7 liters and equipped with an agitator and temperature was raised while stirring. Upon reaching a temperature of 50° C., an aqueous activator containing 0.2 part of sodium ethylenediamine tetraacetate, 0.05 part of ferrous sulfate, 0.2 part of sodium formaldehyde sulfoxylate dihydrate, and 10 parts of ion exchanged water was added along with 0.2 part of diisopropylbenzene hydroperoxide, and reacted for one hour. Subsequently, the reaction was continued while continuously adding 8 parts of styrene, 8 parts of acrylonitrile, 45 parts of methyl methacrylate and 0.2 part of diisopropylbenzene hydroperoxide over a period of four hours. The polymerization conversion of the monomers after the reaction was 96%. The resultant latex was then heated to 90° C. and was subjected to coagulation using 36% calcium chloride aqueous solution. The resulting slurry was then heated to 95° C. and held for 5 minutes. After that, the slurry was washed with water and dehydrated. The material was dried at 75° C. for 24 hours to obtain powdered rubber-reinforced copolymeric resin [A1-3]. A component dissolved by acetone in this rubber-reinforced copolymeric resin [A1-3] was styrene/acrylonitrile/methyl methacrylate=14.0%/11.1%/74.9%.

Production Example 4

Production of Rubber-Reinforced Copolymeric Resin [A1-4]

A rubber-reinforced copolymeric resin [A1-4] was produced in the same manner as in Production Example 2, with the exception that butadiene rubber latex having a volume-average particle diameter of 450 nm was used. A component dissolved by acetone in this rubber-reinforced copolymeric resin [A1-4] was styrene/methyl methacrylate=27.1%/72.9%.

Production Example 5

Production of Rubber-Reinforced Copolymeric Resin [A1-5]

A rubber-reinforced copolymeric resin [A1-5] was produced in the same manner as in Production Example 2, with the exception that butadiene rubber latex having a volume-average particle diameter of 80 nm was used. A component dissolved by acetone in this rubber-reinforced copolymeric resin [A1-5] was styrene/methyl methacrylate=26.7%/73.3%.

Production Example 6

Production of Copolymer [A2-1]

Two jacketed polymerization reactors each having an inner volume of 30 liters and provided with ribbon-shaped vanes were connected and reactors were replaced with nitrogen. After that, 21 parts of styrene, 7 parts of acrylonitrile, 72 parts of methyl methacrylate and 20 parts of toluene were continuously charged into the first polymerization reactor. Next, a solution containing 0.1 part of tert-dodecylmercaptan as a molecular weight adjuster dissolved in 5 parts of toluene, and a solution of 0.1 part of 1,1'-azobis(cyclohexane-1-carbonitrile) as a polymerization initiator dissolved in 5 parts of toluene were continuously supplied. The temperature of the first polymerization reactor was adjusted to 110° C., and polymerization was performed at an average residence time of 2 hours. The polymerization conversion was 60%. A pump provided externally to the first polymerization reactor was used in order to continuously remove material from the resulting polymerization solution and supply the material to the second polymerization reactor in the same amount as the total supplied amount of styrene, acrylonitrile, methyl methacrylate, toluene, molecular weight adjuster and polymerization initiator. The polymerization temperature in this second polymerization reactor was 130° C., and polymerization was performed at an average residence time of 2 hours. The polymerization conversion was 80%. Subsequently, the polymer solution was drawn from the second polymerization reactor, and this polymerization solution was supplied directly to a twin-screw extruder provided with three-stage vents. The unreacted monomers and solvent were removed to obtain a copolymer [A2-1]. The composition of the copolymer [A2-1] was styrene/acrylonitrile/methyl methacrylate=28%/5%/67%. In addition, the intrinsic viscosity [η] of the component dissolved by acetone in the copolymer [A2-1] was 0.25 dl/g.

2-2. Production and Evaluation of Rubber-Reinforced Resin

Example 1-1

56 parts of rubber-reinforced resin [A1-1] and 44 parts of copolymer [A2-1] were mixed in Henschel mixer. After that, the mixture was introduced into a twin-screw extruder, and melt-kneading was carried out at a temperature in the range from 200° C. to 240° C. under the pelletization conditions shown in Table 1, thus producing a pellet (rubber-reinforced resin R1). This rubber-reinforced resin R1 was evaluated on the total amount of detected substances analyzed by the above-mentioned PyGC, Charpy impact strength, haze value, odor and appearance of molded article. The results are shown in Table 1.

Example 1-2 and Comparative Examples 1-1 to 1-4

Rubber-reinforced resins R2 to R6 were obtained using the components according to prescribed amounts in Table 1. The same evaluations were carried out, and the results are compiled in Table 1.

In Table 1, single-vent refers to a single vent extruder attachment location, and double-vent refers to two vent extruder attachment locations. The evacuation levels are described below.
High: −90 kPa
Medium: −85 kPa

TABLE 1

|  |  |  | Example | | Comparative Example | | | |
|---|---|---|---|---|---|---|---|---|
|  |  |  | 1-1 | 1-2 | 1-1 | 1-2 | 1-3 | 1-4 |
| Rubber-reinforced resin | Resin Rubber-reinforced copolymeric resin (parts) | | R1 | R2 | R3 | R4 | R5 | R6 |
|  |  | [A1-1] | 56 |  |  |  |  |  |
|  |  | [A1-2] |  | 100 |  |  |  |  |
|  |  | [A1-3] |  |  | 100 |  |  | 100 |
|  |  | [A1-4] |  |  |  | 100 |  |  |
|  |  | [A1-5] |  |  |  |  | 100 |  |
|  | Copolymer (parts) | [A2-1] | 44 |  |  |  |  |  |
|  | Volume-average particle diameter of rubbery polymer (a) used in production of component [A1] (nm) | | 300 | 310 | 280 | 450 | 80 | 280 |
|  | Content of rubbery polymer (a) in Resin (%) | | 17.0 | 18.1 | 17.5 | 18.2 | 18.1 | 17.5 |
|  | Amount of constituent units for a component dissolved by acetone (%) | Methyl methacrylate unit | 68.0 | 73.1 | 74.9 | 72.9 | 73.3 | 74.9 |
|  |  | Aromatic vinyl compound unit | 24.3 | 26.9 | 14.0 | 27.1 | 26.7 | 14.0 |
|  |  | Cyanidated vinyl compound unit | 7.7 | — | 11.0 | — | — | 11.0 |

TABLE 1-continued

| | | Example | | Comparative Example | | | |
|---|---|---|---|---|---|---|---|
| | | 1-1 | 1-2 | 1-1 | 1-2 | 1-3 | 1-4 |
| Evaluation | Total amount of substances detected at a retention time of 10 to 24 minutes by PyGC (μg/1 g of resin) | 15,100 | 8,500 | 28,500 | 10,000 | 11,500 | 27,500 |
| | Charpy impact strength (kJ/m$^2$) | 8 | 8 | 7 | 2 | 5 | 7 |
| | Haze value (%) | 4 | 4 | 6 | 10 | 5 | 6 |
| | Odor evaluation | ○ | ○ | x | ○ | ○ | x |
| | Appearance | ○ | ○ | ○ | x | x | ○ |
| Pelletization condition | Degassing method | Single-vent | Single-vent | Single-vent | Single-vent | Single-vent | Double-vent |
| | Evacuation level | Medium | Medium | Medium | Medium | Medium | High |

The following is clear from Table 1.

In evaluation of the rubber-reinforced resins, Examples 1-1 and 1-2 both had superior impact resistance, transparency and appearance, with no odor generation when test pieces were fabricated. In addition, the total amount of substances detected at a retention time of 10 to 24 minutes is small as determined by PyGC measurement. It is thus easy to produce molded articles that can prevent contamination and soiling of an article contacted with the molded article and of an equipment on the periphery of the molded article. On the other hand, Comparative Example 1-1 is one in which a considerable amount of acrylonitrile was used. And the total amount of substances detected at retention times of 10 to 24 minutes by PyGC was excessively high, being out of the present invention. It is considered that this will cause contamination and soiling of an article contacted with the molded article and of an equipment on the periphery of the molded article. In addition, since Comparative Examples 1-2 and 1-3 are ones in which the volume-average particle diameter of the rubbery polymer (a) each was outside the range of the present invention. The impact resistance and external appearance of molded articles were inferior. Comparative Example 1-4 is one in which the degassing conditions involved a double-vent. And the attempt was made to enhance the deaeration effects. However, the total amount of substances detected exceeded 20,000 μg.

3. Production and Evaluation of Laminated Article (1)

Examples 1-3 to 1-4

A face layer (molded part) and a back layer (molded part) composed of the following compositions were formed on the surface and back of a support (thickness 0.54 mm) composed of the rubber-reinforced resin R1 or R2 obtained above, and three-layer type laminated articles shown in FIG. 3 were produced.

For the composition used to form the face and back layers, 80 parts of the above-mentioned component [A1-2] and 20 parts of the polyamide elastomer-based anti-static agent (Trade name "PELESTAT NC6321" manufactured by Sanyo Chemical Industries, Ltd.) were mixed in Henschel mixer, whereupon the material was melt-kneaded using a twin-screw extruder to obtain a pellet (setting temperature of cylinder 220° C.; same pelletization conditions as in Example 1-1).

After thoroughly drying the pellet, the pellet was subjected to calender molding to obtain films for the face layer and the back layer having thicknesses of 0.08 mm. Subsequently, a T-die extruder was used, and these two films were superimposed on the two surfaces of the above-mentioned support for hot-lamination (temperature 240° C.) to obtain a three-layer type laminated article. The three-layer type laminated article was evaluated in terms of the total amount of substances detected by PyGC measurement and external appearance of molded articles. The results are shown in Table 2.

TABLE 2

| | | | Example | |
|---|---|---|---|---|
| | | | 1-3 | 1-4 |
| Laminated article | Support Resin for formation of support | | R1 | R2 |
| | Thickness (mm) | | 0.54 | 0.54 |
| | Face layer and back layer Composition for formation | [A1-2] | 80 | 80 |
| | | Anti-static agent | 20 | 20 |
| | Each thickness (mm) | | 0.08 | 0.08 |
| Evaluation | Total amount of substances detected at a retention time of 10 to 24 minutes by PyGC (μg/1 g of laminated article) | | 16,500 | 7,500 |
| | Appearance | | ○ | ○ |

Regarding evaluation of the three-layered laminated articles shown in Table 2, Examples 1-3 and 1-4 were ones in which the rubber-reinforced resins of the present invention were used and had favorable layer adhesiveness as well as excellent appearance of the molded articles.

4. Production and Evaluation of Anti-Static Resin Composition

Anti-static resin compositions were produced using the above-mentioned rubber-reinforced resins and the following polymer type anti-static agents, and various evaluations were carried out. [B-1] Nylon 6-based polyamide elastomer "PELESTAT NC4321"™ manufactured by Sanyo Chemical Industries, Ltd. was used. The reduced viscosity $\eta_{sp/c}$ (measured at 25° C., using 0.5 g/100 mL formic acid solution) is 1.1 dl/g.

[B-2] Nylon 12-Based Polyamide Elastomer

Trial product was used. The reduced viscosity $\eta_{sp/c}$ (measured at 25° C., using 0.5 g/100 mL formic acid solution) is 1.5 dl/g.

Example 2-1

45 parts of the rubber-reinforced copolymeric resin [A1-1], 35 parts of the copolymer [A2-1] and 20 parts of the polymer type anti-static agent [B-1] were mixed using Henschel mixer. After that, this mixture was introduced into a twin-screw extruder and melt-kneaded was performed at a temperature in the range from 200° C. to 240° C. under the pelletization conditions shown in Table 3 to obtain a pellet (anti-static resin composition S1). This anti-static resin composition S1 was evaluated on the total amount of detected substances analyzed by the above-mentioned PyGC, Charpy impact strength, haze value, odor and surface resistivity. The results are shown in Table 3.

Examples 2-2 to 2-6 and Comparative Examples 2-1 to 2-5

Anti-static resin compositions S2 to S11 were obtained using the components according to prescribed amounts in Tables 3 and 4. The same evaluations were carried out, and the results are compiled in Tables 3 and 4.

In Tables 3 and 4, single-vent refers to a single vent extruder attachment location, and double-vent refers to two vent extruder attachment locations. The evacuation levels are described below.

High: −90 kPa
Medium: −85 kPa

TABLE 3

| | | | Example | | | | | |
|---|---|---|---|---|---|---|---|---|
| | | | 2-1 | 2-2 | 2-3 | 2-4 | 2-5 | 2-6 |
| Anti-static resin composition | Composition | | S1 | S2 | S3 | S4 | S5 | S6 |
| | Rubber-reinforced copolymeric resin (parts) | [A1-1] | 45 | | | 60 | | |
| | | [A1-2] | | 80 | 80 | 20 | | |
| | | [A1-4] | | | | | | 80 |
| | | [A1-5] | | | | | 80 | |
| | Copolymer (parts) | [A2-1] | 35 | | | | | |
| | Polymer type anti-static agent (parts) | [B-1] | 20 | 20 | | 20 | 20 | 20 |
| | | [B-2] | | | 20 | | | |
| | Volume-average particle diameter of rubbery polymer (a) used in production of component [A1] (nm) | | 300 | 310 | 310 | 305 | 450 | 80 |
| | Content of rubbery polymer (a) in Resin (%) | | 13.6 | 14.1 | 14.0 | 21.0 | 14.0 | 14.1 |
| | Amount of constituent units for a component dissolved by acetone (%) | Methyl methacrylate unit | 68.0 | 73.1 | 73.0 | 70.8 | 72.9 | 73.3 |
| | | Aromatic vinyl compound unit | 24.3 | 26.9 | 27.0 | 24.6 | 27.1 | 26.7 |
| | | Cyanidated vinyl compound unit | 7.7 | — | — | 4.6 | — | — |
| Evaluation | Total amount of substances detected at a retention time of 10 to 24 minutes by PyGC (µg/1 g of Composition) | | 17,100 | 9,850 | 8,500 | 14,500 | 12,000 | 12,350 |
| | Charpy impact strength (kJ/m$^2$) | | 12 | 12 | 12 | 11 | 9 | 10 |
| | Haze value (%) | | 10 | 12 | 13 | 13 | 20 | 9 |
| | Odor evaluation | | ○ | ○ | ○ | ○ | ○ | ○ |
| | Surface resistivity (Ω) | | $5 \times 10^9$ | $9 \times 10^9$ | $2 \times 10^{10}$ | $9 \times 10^9$ | $8 \times 10^9$ | $9 \times 10^9$ |
| Pelletization condition | Degassing method | | Single-vent | Single-vent | Single-vent | Single-vent | Single-vent | Single-vent |
| | Evacuation level | | Medium | Medium | Medium | Medium | Medium | Medium |

TABLE 4

| | | | Comparative Example | | | | |
|---|---|---|---|---|---|---|---|
| | | | 2-1 | 2-2 | 2-3 | 2-4 | 2-5 |
| Anti-static resin composition | Composition | | S7 | S8 | S9 | S10 | S11 |
| | Rubber-reinforced copolymeric resin (parts) | [A1-1] | 56 | | | | |
| | | [A1-2] | | 100 | | | |
| | | [A1-3] | | | 100 | 80 | 80 |
| | Copolymer (parts) | [A2-1] | 44 | | | | |
| | Polymer type anti-static agent (parts) | [B-1] | | | | 20 | 20 |
| | Volume-average particle diameter of rubbery polymer (a) used in production of component [A1] (nm) | | 300 | 310 | 280 | 280 | 280 |
| | Content of rubbery polymer (a) in Resin (%) | | 17.0 | 18.1 | 17.5 | 14.3 | 14.3 |
| | Amount of constituent units for a component dissolved by acetone (%) | Methyl methacrylate unit | 68.0 | 73.1 | 74.9 | 74.5 | 74.5 |
| | | Aromatic vinyl compound unit | 24.3 | 26.9 | 14.0 | 14.1 | 14.1 |
| | | Cyanidated vinyl compound unit | 7.7 | — | 11.0 | 11.4 | 11.4 |
| Evaluation | Total amount of substances detected at a retention time of 10 to 24 minutes by PyGC (µg/1 g of composition) | | 15,100 | 8,500 | 28,500 | 29,100 | 28,500 |
| | Charpy impact strength (kJ/m$^2$) | | 8 | 8 | 7 | 10 | 10 |
| | Haze value (%) | | 4 | 4 | 6 | 14 | 14 |
| | Odor evaluation | | ○ | ○ | x | x | x |
| | Surface resistivity (Ω) | | $>10^{13}$ | $>10^{13}$ | $>10^{13}$ | $9 \times 10^9$ | $9 \times 10^9$ |
| Pelletization condition | Degassing method | | Single-vent | Single-vent | Single-vent | Single-vent | Single-vent |
| | Evacuation level | | Medium | Medium | Medium | Medium | High |

The following is clear from Tables 3 and 4

In evaluation of the anti-static resin compositions, Examples 2-1 to 2-6 all had superior impact resistance and anti-static properties, with no odor generation when test pieces were fabricated. In addition, the total amount of substances detected at a retention time of 10 to 24 minutes was small as determined by PyGC measurement. It is thus easy to produce molded articles that can prevent contamination and soiling of an article contacted with the molded article and of an equipment on the periphery of the molded article. On the other hand, Comparative Examples 2-1 and 2-2 are ones in which the component [B] was not contained. And anti-static properties were inferior. Comparative Example 2-3 is one in which the component [B] was not contained. And the total amount of substances detected at retention times of 10 to 24 minutes by PyGC measurements was too high, placing the example outside the range of the present invention. It is considered that this will cause contamination and soiling of an article contacted with the molded article and of an equipment on the periphery of the molded article. Further, Comparative Examples 2-4 and 2-5 are also ones in which the total amount of substances detected at retention times of 10 to 24 minutes by PyGC measurements was too high. It is considered that this will cause contamination and soiling of an article contacted with the molded article and of an equipment on the periphery of the molded article.

5. Production and Evaluation of Laminated Article (2)

Examples 2-7 and 2-8

A face layer (molded part) and a back layer (molded part) composed of the anti-static resin composition S2 were formed on the surface and back of a support (thickness 0.54 mm) composed of the anti-static resin composition S7 or S8 obtained above, and three-layer type laminated articles shown in FIG. 3 were produced. The three-layer type laminated article was evaluated in terms of the total amount of substances detected by PyGC measurement, surface resistivity and external appearance of molded articles. The results are shown in Table 5.

TABLE 5

|  |  | Example | |
|---|---|---|---|
|  |  | 2-7 | 2-8 |
| Laminated | Support |  |  |
|  | Resin for formation of support | S7 | S8 |
|  | Thickness (mm) | 0.54 | 0.54 |
|  | Face layer and back layer |  |  |
|  | Composition | S2 | S2 |
|  | Each thickness (mm) | 0.08 | 0.08 |
| Evaluation | Total amount of substances detected at a retention time of 10 to 24 minutes by PyGC (μg/1 g of laminated article) | 16,500 | 7,500 |
|  | Surface resistivity (Ω) | $9 \times 10^9$ | $8.5 \times 10^9$ |
|  | Appearance | ○ | ○ |

Regarding evaluation of the three-layered laminated articles shown in Table 5, Examples 2-7 and 2-8 were ones in which the anti-static resin compositions of the present invention were used and had favorable layer adhesiveness as well as anti-static properties and excellent appearance of the molded articles.

INDUSTRIAL APPLICABILITY

The rubber-reinforced resin of the present invention has superior impact resistance and transparency, as well as excellent appearance when a molded article such as a film is formed. Therefore, a molded article thereof is suitable as a container for an electronic device, an equipment for the production of an electronic device, and the like. In addition, the molded article is suitable in various members and components in fields such as office equipment, household electrical appliances, automobiles, sanitary applications and construction materials.

Moreover, the anti-static resin composition of the present invention has superior impact resistance and anti-static properties, as well as excellent appearance when a molded article such as a film is formed. Therefore, a molded article thereof is suitable as a container for an electronic device, an equipment for the production of an electronic device, and the like. In addition, the molded article is suitable in various members and components in fields such as office equipment, household electrical appliances, automobiles, sanitary applications and construction materials.

What is claimed is:

1. An anti-static resin composition comprising:
70% to 95% by mass of a rubber-reinforced resin and 5% to 30% by mass of a polymer type anti-static agent based on 100% by mass of the total of these components,
wherein said rubber-reinforced resin consists of a rubber-reinforced copolymeric resin (A1) obtained by polymerization of 20 to 95 parts by mass of a monomer component (b) comprising 60% to 95% by mass of methyl methacrylate (b1), 5% to 40% by mass of an aromatic vinyl compound (b2), and 0% to 10% by mass of a cyanidated vinyl compound (b3) where (b1)+(b2)+(b3)=100% by mass in the presence of 5 to 80 parts by mass of a diene-based rubbery polymer (a) having a volume-average particle diameter of 200 to 400 nm where (a)+(b)=100 parts by mass, or a mixture of said rubber-reinforced copolymeric resin (A1) and a copolymer (A2) of said monomer component (b), said rubber-reinforced resin has haze value of 15% or less, and has the total amount of substances detected at a retention time of 10 to 24 minutes, as determined by pyrolysis-gas chromatography measurement under conditions of a pyrolysis temperature of 423° C. and a pyrolysis time of 30 seconds, of 20,000 μg or less with respect to 1 gram of said rubber-reinforced resin,
said polymer type anti-static agent comprising a polyamide 12-based elastomer, and
said anti-static resin composition contains the diene-based rubbery polymer (a) in an amount of 5% to 40% by mass, and has the total amount of substances detected at a retention time of 10 to 24 minutes, as determined by pyrolysis-gas chromatography measurement under conditions of a pyrolysis temperature of 423° C. and a pyrolysis time of 30 seconds, of 20,000 μg or less with respect to 1 gram of said composition.

2. A molded article comprising said anti-static resin composition according to claim 1.

3. A laminated article comprising at a molded article comprising said anti-static resin composition according to claim 1 laminated to at least one surface of a support comprising a thermoplastic polymer.

* * * * *